US010560617B2

(12) United States Patent
Wippermann et al.

(10) Patent No.: US 10,560,617 B2
(45) Date of Patent: Feb. 11, 2020

(54) DEVICE COMPRISING A MULTI-CHANNEL IMAGING DEVICE AND METHOD OF PRODUCING SAME

(71) Applicant: Fraunhofer-Gesellschaft zur Förderung der angewandten Forschung e.V., München (DE)

(72) Inventors: Frank Wippermann, Meiningen (DE); Andreas Brückner, Jena (DE); Andreas Bräuer, Schlöben (DE); Alexander Oberdörster, Jena (DE)

( * ) Notice: Subject to any disclaimer, the term of this patent is extended or adjusted under 35 U.S.C. 154(b) by 76 days.

(21) Appl. No.: 15/898,374

(22) Filed: Feb. 16, 2018

(65) Prior Publication Data

US 2018/0198963 A1 Jul. 12, 2018

Related U.S. Application Data

(63) Continuation of application No. PCT/EP2016/069644, filed on Aug. 18, 2016.

(30) Foreign Application Priority Data

Aug. 19, 2015 (DE) .................. 10 2015 215 841

(51) Int. Cl.
    *H04N 5/225* (2006.01)
    *H04N 13/243* (2018.01)
    (Continued)

(52) U.S. Cl.
    CPC ............ *H04N 5/2254* (2013.01); *B23P 19/04* (2013.01); *G02B 7/1821* (2013.01);
    (Continued)

(58) Field of Classification Search
    CPC .. H04N 5/2254; H04N 5/2328; H04N 13/243; G02F 1/157; G02B 13/001;
    (Continued)

(56) References Cited

U.S. PATENT DOCUMENTS 6,992,699 B1 1/2006 Vance et al.
2007/0247540 A1 10/2007 Iguchi
(Continued)

FOREIGN PATENT DOCUMENTS

CN 102736368 A 10/2012
DE 19781569 B4 3/1999
(Continued)

OTHER PUBLICATIONS

International Preliminary Report on Patentability (IPRP) dated Feb. 22, 2018 issued in related PCT App. No. PCT/EP2016/069644 (38 pages with English translation).
(Continued)

*Primary Examiner* — Jared Walker

(57) ABSTRACT

A device includes a housing having a first transparent area and a second transparent area and a multi-aperture imaging device arranged inside the housing and including a beam deflector. The device includes a first diaphragm and a second diaphragm, the portable device having a first operating state and a second operating state. In the first operating state, the beam deflector deflects an optical path of the imaging device such that it passes through the first transparent area and that the second diaphragm at least partly optically closes the second transparent area. In the second operating state, the beam deflector deflects the optical path of the imaging device such that it passes through the second transparent area. In the second operating state, the first diaphragm at least partly optically closes the first transparent area.

18 Claims, 13 Drawing Sheets

(51) Int. Cl.
 G02B 7/182 (2006.01)
 G02B 13/00 (2006.01)
 G02F 1/157 (2006.01)
 B23P 19/04 (2006.01)
 H04N 5/232 (2006.01)

(52) U.S. Cl.
 CPC ........... *G02B 13/001* (2013.01); *G02F 1/157* (2013.01); *H04N 5/2328* (2013.01); *H04N 13/243* (2018.05)

(58) Field of Classification Search
 CPC ............... G02B 7/1821; G02B 27/646; G02B 26/0816; G02B 5/005; G02B 13/06; B23P 19/04
 USPC .......................................................... 348/47
 See application file for complete search history.

(56) References Cited

U.S. PATENT DOCUMENTS

| | | |
|---|---|---|
| 2010/0045773 A1 | 2/2010 | Ritchey |
| 2013/0147943 A1 | 6/2013 | Katzir et al. |
| 2014/0055625 A1 | 2/2014 | Smith |
| 2014/0111650 A1 | 4/2014 | Georgiev et al. |
| 2015/0109468 A1 | 4/2015 | Laroia |

FOREIGN PATENT DOCUMENTS

| | | |
|---|---|---|
| DE | 102014213371 B3 | 8/2015 |
| JP | 2001-268416 A | 9/2001 |
| JP | 2002-171430 A | 6/2002 |
| JP | 2006-215350 A | 8/2006 |
| JP | 2007-116361 A | 5/2007 |
| JP | 2008-180773 A | 8/2008 |
| JP | 2010-268078 A | 11/2010 |
| JP | 2010-268078 A | 11/2011 |
| JP | 2011-239207 A | 11/2011 |
| JP | 2014-052335 A | 3/2014 |
| KR | 1020070116104 A | 12/2007 |
| TW | 538639 B | 6/2003 |
| WO | WO 2015/015383 A2 | 2/2015 |

OTHER PUBLICATIONS

International Search Report dated Oct. 13, 2016 issued in related PCT App. No. PCT/EP2016/069644 (5 pages with English translation).
International Written Opinion issued in related PCT App. No. PCT/EP2016/069644 (please see IPRP) (5 pages).
Office Action issued in parallel Taiwan Patent App. No. 105126428 dated Sep. 6, 2017 (12 pages with English translation).
Office Action dated Mar. 26, 2019 issued in the parallel Japanese patent application No. 2018-509610 (16 pages with English translation).
Decision to Grant dated Oct. 29, 2019 issued in the parallel Korean patent application No. 10-2018-7007482 (7 pages).
Office Action dated Dec. 3, 2019 issued in the parallel Japanese patent application No. 2018-509610 (12 pages).

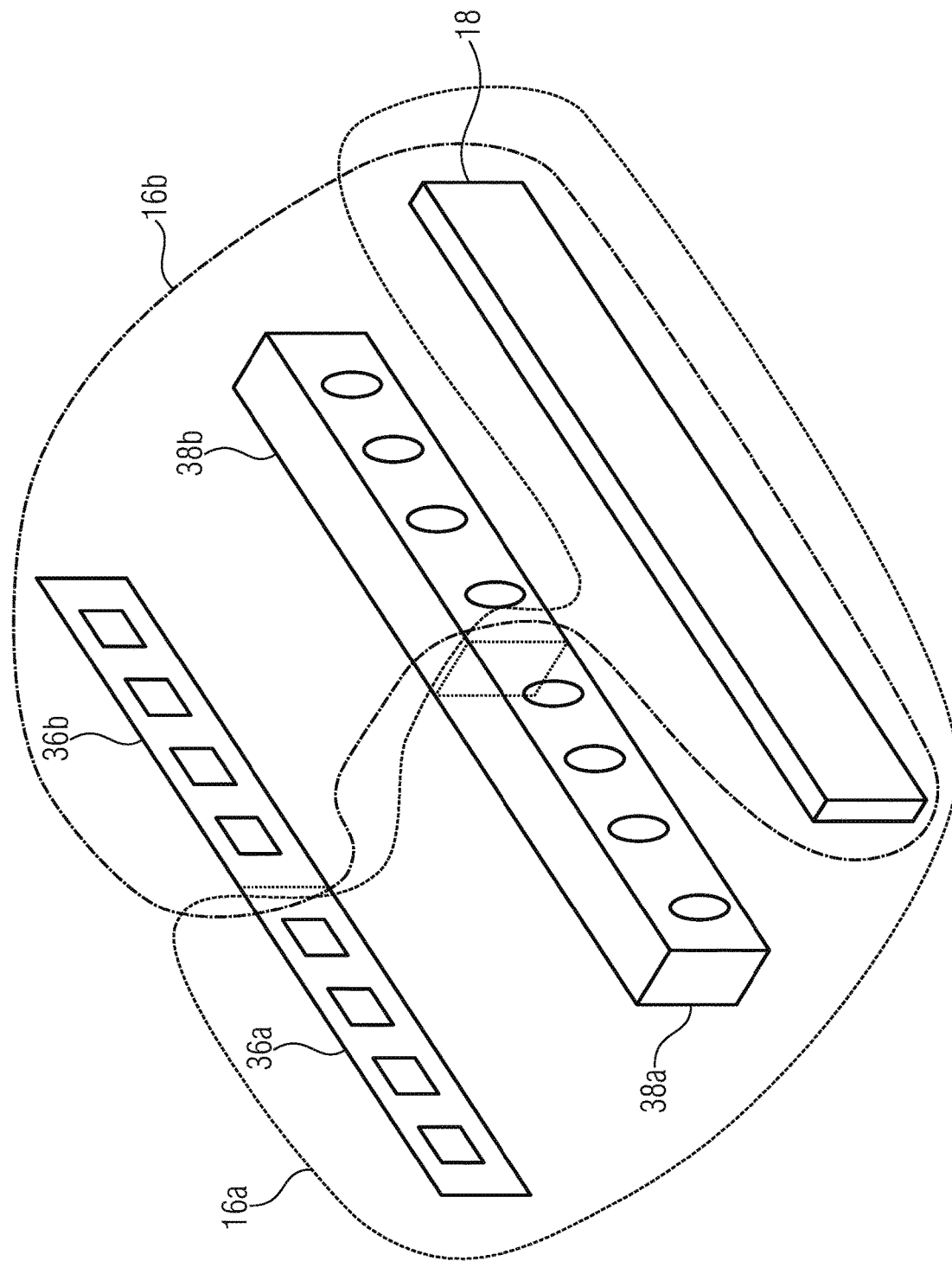

DEVICE COMPRISING A MULTI-CHANNEL IMAGING DEVICE AND METHOD OF PRODUCING SAME

CROSS-REFERENCE TO RELATED APPLICATIONS

This application is a continuation of co-pending International Application No. PCT/EP2016/069644, filed Aug. 18, 2016, which is incorporated herein by reference in its entirety, and additionally claims priority from German Application No. 102015215841.1, filed Aug. 19, 2015, which is also incorporated herein by reference in its entirety.

The present invention relates to a device comprising a multi-channel imaging device and to a method of producing same. The present invention further relates to a portable device comprising a multi-aperture imaging device.

BACKGROUND OF THE INVENTION

Conventional cameras transmit the total field of view within one channel and are limited in terms of their miniaturization. In mobile devices such as smart phones, for example, two cameras are employed which are oriented in and counter to the direction of the surface normal of the display.

Therefore, what would be desirable is a concept which enables miniaturized devices to capture a total field of view while ensuring high image quality.

SUMMARY

According to an embodiment, a device may have: a housing having a first transparent area and a second transparent area; a multi-aperture imaging device arranged inside the housing and including beam-deflecting means; a first diaphragm and a second diaphragm; the portable device having a first operating state and a second operating state; wherein in the first operating state, the beam-deflecting means deflects an optical path of the multi-aperture imaging device such that it passes through the first transparent area and that the second diaphragm at least partly optically closes the second transparent area; and wherein in the second operating state, the beam-deflecting means deflects the optical path of the multi-aperture imaging device such that it passes through the second transparent area and that the first diaphragm at least partly optically closes the first transparent area; wherein the beam-deflecting means can be moved between a first position in the first operating state and a second position in the second operating state on the basis of a rotational movement about an axis of rotation; wherein optical channels of the multi-aperture imaging device are directed by the beam-deflecting means on the basis of a set viewing direction toward varying total fields of view and have angles in relation to one another within a viewing direction, so that the optical channels are directed into partial fields of view of a total field of view which, at the most, only partly overlap; and wherein optical channels each include one or several optics for changing an optical path of the imaging device and an image sensor area and are deflected by the beam-deflecting means.

According to another embodiment, a device may have: a housing having a first transparent area and a second transparent area; a multi-aperture imaging device arranged inside the housing and including beam-deflecting means; a first diaphragm and a second diaphragm; the portable device having a first operating state and a second operating state; wherein in the first operating state, the beam-deflecting means deflects an optical path of the multi-aperture imaging device such that it passes through the first transparent area and that the second diaphragm at least partly optically closes the second transparent area; and wherein in the second operating state, the beam-deflecting means deflects the optical path of the multi-aperture imaging device such that it passes through the second transparent area and that the first diaphragm at least partly optically closes the first transparent area; at least one further multi-aperture imaging device, the device being configured to at least stereoscopically capture a total field of view.

According to another embodiment, a method of providing a device may have the steps of: providing a housing having a first transparent area and a second transparent area; arranging a multi-aperture imaging device, which includes beam-deflecting means, inside the housing; arranging a first diaphragm and a second diaphragm; so that the portable device has a first operating state and a second operating state; so that in the first operating state, the beam-deflecting means deflects an optical path of the imaging device such that it passes through the first transparent area and that the second diaphragm at least partly optically closes the second transparent area; and so that in the second operating state, the beam-deflecting means deflects the optical path of the imaging device such that it passes through the second transparent area and that the first diaphragm at least partly optically closes the first transparent area; so that the beam-deflecting means can be moved between a first position in the first operating state and a second position in the second operating state on the basis of a rotational movement about an axis of rotation; so that optical channels of the multi-aperture imaging device may be directed by the beam-deflecting means on the basis of a set viewing direction toward varying fields of view and may have angles in relation to one another within a viewing direction, so that the optical channels are directed into partial fields of view of a total field of view which, at the most, only partly overlap, so that optical channels each include one or several optics for changing an optical path of the imaging device and an image sensor area and are deflected by the beam-deflecting means.

According to another embodiment, a method of providing a device may have the steps of: providing a housing having a first transparent area and a second transparent area; arranging a multi-aperture imaging device, which includes beam-deflecting means, inside the housing; arranging at least one further multi-aperture imaging device, so that the device is configured to at least stereoscopically capture a total field of view; arranging a first diaphragm and a second diaphragm; so that the portable device has a first operating state and a second operating state; so that in the first operating state, the beam-deflecting means deflects an optical path of the imaging device such that it passes through the first transparent area and that the second diaphragm at least partly optically closes the second transparent area; and so that in the second operating state, the beam-deflecting means deflects the optical path of the imaging device such that it passes through the second transparent area and that the first diaphragm at least partly optically closes the first transparent area.

A core idea of the present invention consists in having found that the above object can be achieved in that a deflection of optical paths of optical channels enables capturing various fields of view by means of a multi-aperture imaging device, which enables miniaturization, and that unused transparent areas can be closed for unused directions of the optical paths by means of diaphragms, so that incidence of stray light is reduced and that a high quality of the images can be obtained.

In accordance with an embodiment, a device includes a housing having a first transparent area and a second transparent area and an imaging device arranged inside the housing and including beam-deflecting means. The device includes a first diaphragm and a second diaphragm. The device has a first operating state and a second operating state. In the first operating state, the beam-deflecting means deflects an optical path of the imaging device such that it passes through the first transparent area and that the second diaphragm at least partly optically closes the second transparent area. In the second operating state, the beam-deflecting means deflects the optical path of the imaging device such that it passes through the second transparent area and that the first diaphragm at least partly optically closes the first transparent area.

In accordance with a further embodiment, a method of providing a device includes providing a housing having a first transparent area and a second transparent area, arranging an imaging device, which includes beam-deflecting means, inside the housing, and arranging a first diaphragm and a second diaphragm. The first and second diaphragms are arranged such that the device has a first operating state and a second operating state, so that in the first operating state, the beam-deflecting means deflects an optical path of the imaging device such that it passes through the first transparent area and that the second diaphragm at least partly optically closes the second transparent area. The diaphragms are arranged such that in the second operating state, the beam-deflecting means deflects the optical path of the imaging device such that it passes through the second transparent area and that the first diaphragm at least partly optically closes the first transparent area.

On the basis of closing transparent areas which are different from that transparent area through which the optical path is directed, incidence of stray light into the interior of the housing can be reduced or prevented. This enables a high image quality to be achieved.

BRIEF DESCRIPTION OF THE DRAWINGS

Embodiments of the present invention will be detailed subsequently referring to the appended drawings, in which:

FIG. 8 shows a schematic structure including a first multi-aperture imaging device and a second multi-aperture imaging device comprising a shared image sensor.

DETAILED DESCRIPTION OF THE INVENTION

Figure 1:
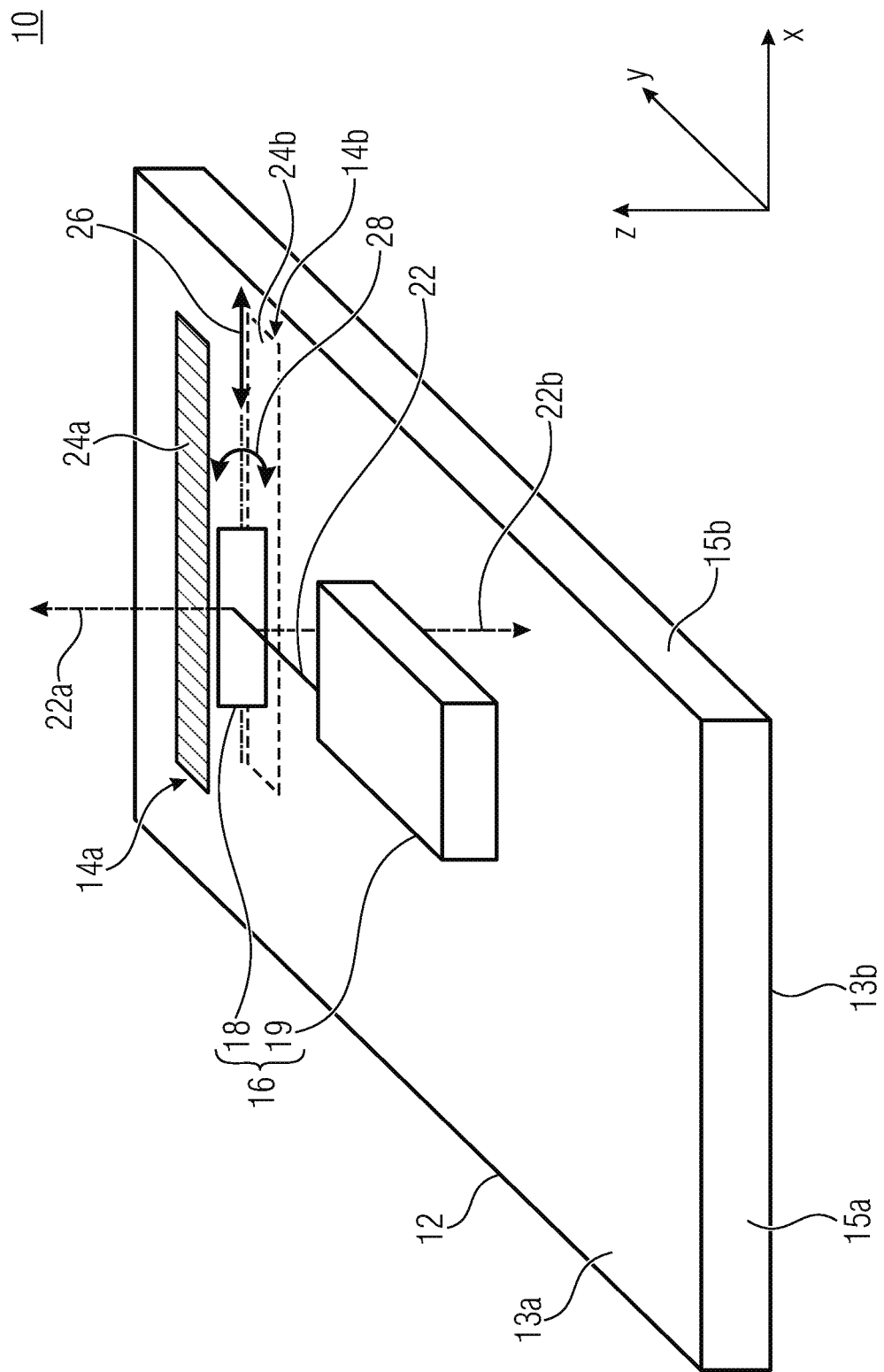
FIG. 1 shows a schematic perspective view of a device in accordance with an embodiment.

Before embodiments of the present invention will be explained in more detail below with reference to the drawings, it shall be noted that elements, objects and/or structures which are identical and have identical functions or actions will be provided with identical reference numerals in the various figures, so that the descriptions, presented in different embodiments, of said elements are interchangeable and/or mutually applicable.

In subsequently described embodiments, reference will be made to main sides and secondary sides of a device. A main side of a device may be understood, in embodiments described herein, to be a side of a housing or of the device which has a large or a largest dimension as compared to other sides. For example, a first main side may designate a front side and a second main side may designate a rear side, even though this is not to have any limiting effect. Secondary sides may be understood to mean sides or faces which connect the main sides with one another.

Even though embodiments described below relate to portable devices, the aspects set forth may readily be transferred to other mobile or immobile devices. It is understood that the described portable devices may be installed in other devices, e.g., in vehicles. Moreover, a housing of a device may be configured to be non-portable. This is why the embodiments described below are not intended to be limited to portable devices but may refer to any implementation of a device.

FIG. 1 shows a schematic perspective view of a portable device 10 in accordance with an embodiment. The portable device 10 includes a housing 12 comprising a first transparent area 14a and a second transparent area 14b. For example, the housing 12 may be formed of an opaque plastic, a metal or the like. The transparent areas 14a and/or 14b may be integrally formed with the housing 12 or be formed in a multi-part manner. The transparent areas 14a and/or 14b may be recesses in the housing 12, for example. Alternatively, a transparent material may be arranged in an area of the recesses or of the transparent areas 14a and/or 14b. Transparent materials of the transparent areas 14a and/or 14b may be transparent at least within such a wavelength range of an electromagnetic radiation to which an imaging device 16, or an image sensor of same, is receptive. This means that the transparent areas 14a and/or 14b may be configured to be partly or fully opaque in wavelength ranges different from the former. For example, the imaging device 16 may be configured to capture a visible wavelength range. The transparent areas 14a and/or 14b may be configured to be partly or fully opaque or untransparent within an ultraviolet range and/or an infrared range.

The imaging device 10 is disposed inside the housing 12. The imaging device 16 includes beam-deflecting means 18 and image capturing means 19. The image capturing means 19 may include two or more optical channels, each of which comprises one or more optics for changing (e.g., concentrating, focusing or scattering) an optical path of the imaging device 16, and an image sensor. For example, the image capturing means 19 may comprise one or more image sensors whose optical paths are directed through one or more optical channels onto the beam-deflecting means 18 and are deflected by the latter. As is described in the context of FIG. 6, the at least two optical channels may be deflected such that they will capture mutually overlapping partial fields of view (partial object areas) of a total field of view (total object area). The imaging device 16 may be referred to as a multi-aperture imaging device.

The portable device 10 has a first operating state and a second operating state. The operating state may be correlated with a location, position or orientation of the beam-deflecting means 18. In the first operating state, the beam-deflecting means may deflect the optical path 22 of the imaging device 16 such that said optical path 22 passes through the first transparent area 14a, as indicated by the optical path 22a. In the second operating state, the beam-deflecting means 18 may be configured to deflect the optical path 22 of the imaging device 16 such that said optical path 22 passes through the second transparent area 14b, as indicated by the optical path 22b. This may also be understood to mean that the beam-deflecting means 18 directs the optical path 22 through one of the transparent areas 14a and/or 14b at one point in time and on the basis of the operating state. On the basis of the operating state, a position of a field of view (object area) captured by the imaging device 16 may be arranged in a manner varying in space.

The portable device 10 includes a first diaphragm 24a and a second diaphragm 24b. The diaphragm 24a is arranged in an area of the transparent area 14a and is configured to at least partly optically close the transparent area 14a when the diaphragm 24a is in a closed state. In accordance with an embodiment, the diaphragm 24a is configured to close at least 50%, 90% or at least 99% of the surface area of the transparent area 14a when the diaphragm 24a is in the closed state. The diaphragm 24b is configured to close the transparent area 14b in the same or a similar manner as described for the diaphragm 24a in the context of the transparent area 14a. In the first operating state, during which the beam-deflecting means 18 deflects the optical path 22 toward the optical path 22a, the diaphragm 24b may at least partly optically close the transparent area 14b so that stray light enters the housing 12 to a small extent or possibly not at all through the transparent area 14b. This enables a small impact on the capturing of the field of view in the first operating state by stray light entering the diaphragm 14b. In the second operating state, in which, e.g., the optical path 22b exits the housing 12, the diaphragm 24a may at least partly optically close the transparent area 14a. In simplified terms, the diaphragms 24a and/or 24b may be configured such that they close transparent areas 14a and/or 14b such that stray light enters to a small extent, or does not enter at all, through them from undesired directions (in which, e.g., the captured field of view is not located). The diaphragms 24a and/or 24b may be configured to be continuous and may be arranged in each case in relation to all of the optical channels of the imaging device 16. This means that on the basis of the respective operating state, the diaphragms 24a and 24b may be used by any of the optical channels of the multi-aperture imaging device. In accordance with an embodiment, one diaphragm 24a or 24b, which is used by all of the optical channels, is arranged rather than individual round diaphragms being arranged for each optical channel. The diaphragms 24a and/or 24b may have, e.g., rectangular, oval, round or elliptical shapes, in line with a polygon chain.

Switching between the first and second operating states may include, e.g., a movement of the beam-deflecting means 18 on the basis of a translational movement 26 and/or on the basis of a rotational movement 28.

The diaphragms 24a and/or 24b may be configured as mechanical diaphragms, for example. Alternatively, the diaphragms 24a and/or 24b may be configured as electrochromic diaphragms. This enables using a small number of mechanically moveable parts. Moreover, configuring the diaphragms 24a and/or 24b as electrochromic diaphragms enables noiseless opening and/or closing of the transparent areas 14a and/or 14b as well as an implementation that can be readily integrated into an optic of the portable device 10. For example, the diaphragms 24a and/or 24b may be configured such that they are hardly or not at all perceived by a user when they are in a closed state since there are few optical differences as compared to the housing 12.

The housing 12 may be configured to be flat. For example, the main sides 13a and/or 13b may be spatially arranged within an x/y plane or a plane parallel thereto. Secondary sides or secondary faces 15a and/or 15b located between the main sides 13a and 13b may be spatially arranged such that they are oblique or perpendicular thereto, it being possible for the main sides 13a and/or 13b and/or the secondary sides 15a and/or 15b to be configured to be curved or planar. An extension of the housing 12 along a first housing direction z between the main sides 13a and 13b, for example in a manner that is parallel or anti-parallel to a surface normal of a display of the portable device 10, may be small as compared to further dimensions of the housing 12 along further extensions, i.e., along an extension direction of the main side 13a and/or 13b. The secondary sides 15a and 15b may be parallel or anti-parallel to the surface normal of a display. The main sides 13a and/or 13b may be spatially arranged perpendicularly to a surface normal of a display of the portable device 10. Thus, for example, an extension of the housing along the x direction and/or along the y direction may be at least three times, at least five times or at least seven times an extension of the housing 12 along the first extension z. In simplified terms, however without having any limiting effect, the extension of the housing z may be understood to be the thickness or depth of the housing 12.

Figure 2:
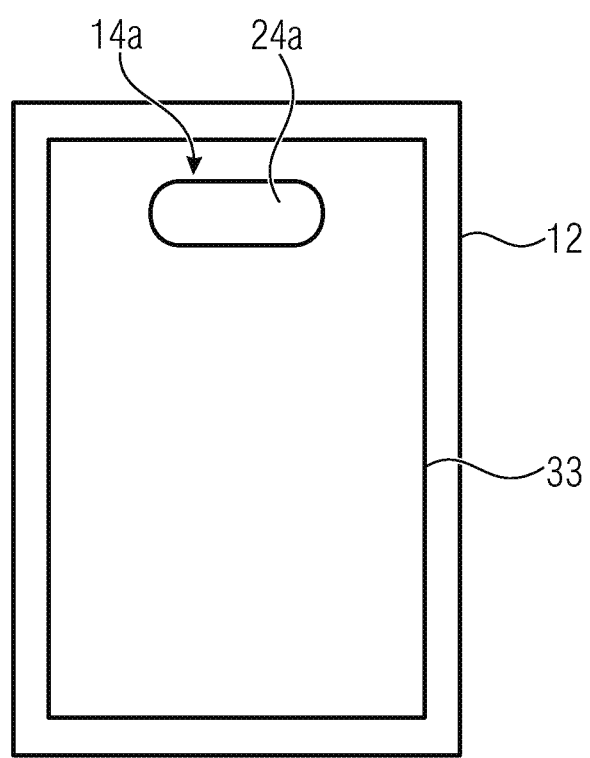
FIG. 2 shows a schematic view of a main side of a device in accordance with a further embodiment.

FIG. 2 shows a schematic view of a main side of a portable device 20 in accordance with an embodiment. The portable device may include the device 10. The portable device 20 may include a display 33, for example a screen. For example, the device 20 may be a portable communication device such as a mobile phone (smartphone), a tablet computer, a mobile music player, a monitor or a visual display unit, which comprises the imaging device 16. The transparent area 14a and/or the transparent area 14b may be arranged in an area of the housing 12 within which the display 33 is arranged. This means that the diaphragm 24a and/or 24b may be arranged in an area of the display 33. For example, the transparent area 14a and/or 14b and/or the diaphragm 24a and/or 24b may be concealed by the display 33. In an area of the display 33 in which the diaphragm 24a and/or 24b is arranged, information of the display may be presentable at least periodically. Said presentation of the information may be any operation of the portable device 20. For example, a view-finder function may be presentable on the display 33 wherein a field of view may be presented which is scanned or captured by the imaging device inside the housing 12. Alternatively or additionally, images which have already been captured or any other information may be presentable. In simple words, the transparent area 14a and/or the diaphragm 24a may be concealed by the display 33, so that the transparent area 14a and/or the diaphragm 24a can hardly be perceived or cannot be perceived during operation of the portable device 20.

The transparent areas 14a and 14b may each be arranged in at least one main side 13a of the housing 12 and/or in an opposite main side. In simple words, the housing 12 may have a transparent area at the front and a transparent area at the back. In this context it shall be noted that the terms front and back may be randomly replaced by other terms such as left and right, top and bottom or the like, for example, without limiting any of the embodiments described herein. In accordance with further embodiments, the transparent areas 14a and/or 14b may be arranged in a secondary side. Arranging of the transparent areas may be arbitrary and/or be dependent on directions into which the optical paths of the optical channels are deflectable.

In the area of the transparent area 14a or of the diaphragm 24a, the display 33 may be configured, for example, to be periodically deactivated while an image is being captured by means of the imaging device, or to increase transparency of the display 33 beyond the housing 12. Alternatively, the display 33 may also remain active in this area, for example when the display 33 emits no or hardly any electromagnetic radiation in a relevant wavelength range into the interior of the portable device 20 and/or of the housing 12 or toward the imaging device 16.

Figure 3A:
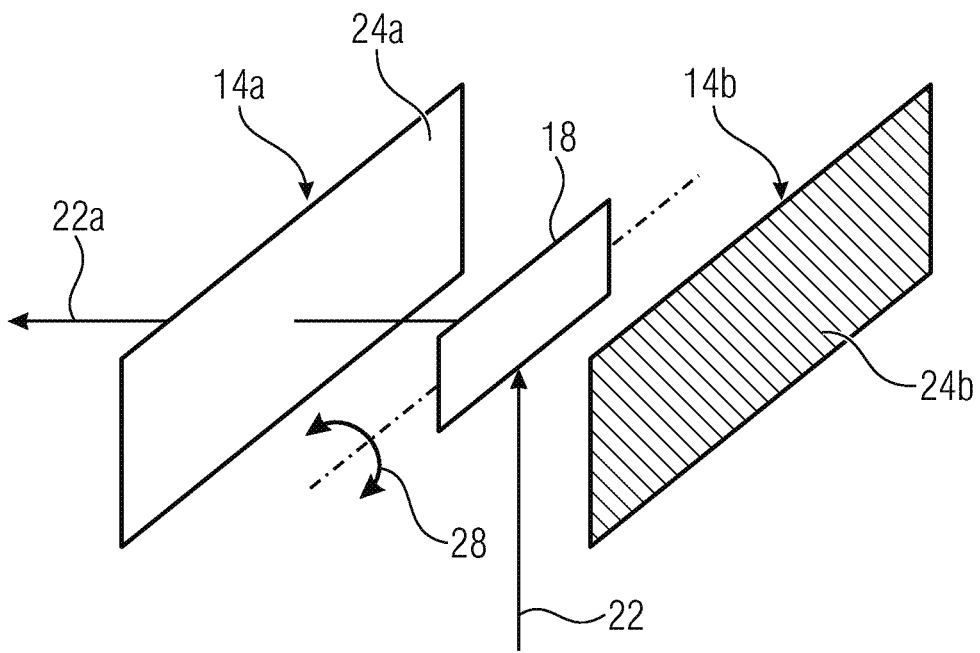
FIG. 3A shows a beam-deflecting means and a state of diaphragms in a first operating state in accordance with an embodiment.

FIG. 3A shows the beam-deflecting means 18 and a state of the first diaphragm 24a as well as of the second diaphragm 24b in the first operating state. E.g., the beam-deflecting means 18 deflects the optical path 22 such that same passes through the transparent area 14a as the optical path 22a. The diaphragm 24b may periodically at least partly close the transparent area 14b, so that stay light does not enter, or enters to a small extent only, the interior of the housing of the portable device through the transparent area 14b.

Figure 3B:
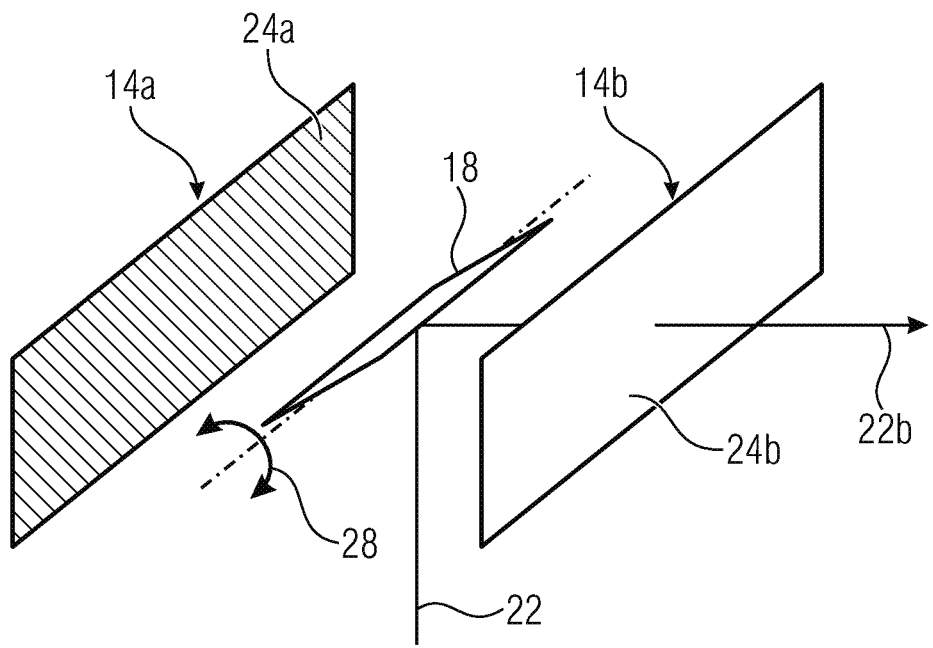
FIG. 3B shows the beam-deflecting means and the diaphragms in a second operating state.

FIG. 3B shows the beam-deflecting means 18, the diaphragm 24a and the diaphragm 24b in the second operating state. The beam-deflecting means 18 may deflect the optical path 22 such that same passes through the transparent area 14b as the optical path 22b while the diaphragm 24a at least partly optically closes the transparent area 14a. In the second operating state, the diaphragm 24b may exhibit an at least partly or fully opened state. The opened state may relate to a transparency of the diaphragm. For example, an electrochromic diaphragm may be referred to as being opened or closed as a function of a control state, without mechanical components being moved. During the second operating state, a diaphragm 24b configured as an electrochromic diaphragm may be at least periodically partly or fully transparent to a wavelength range to be detected by the imaging device. In the first operating state as depicted in FIG. 3A, the diaphragm 24b may be partly or fully untransparent or opaque to this wavelength range. Switching between the first operating state of FIG. 3A and the second operating state of FIG. 3B may be obtained on the basis of the rotational movement 28 of the deflecting means 18 and/or on the basis of a translational movement, as described in the context of FIGS. 4A and 4B, or may include at least one of said movements.

Figure 4A:
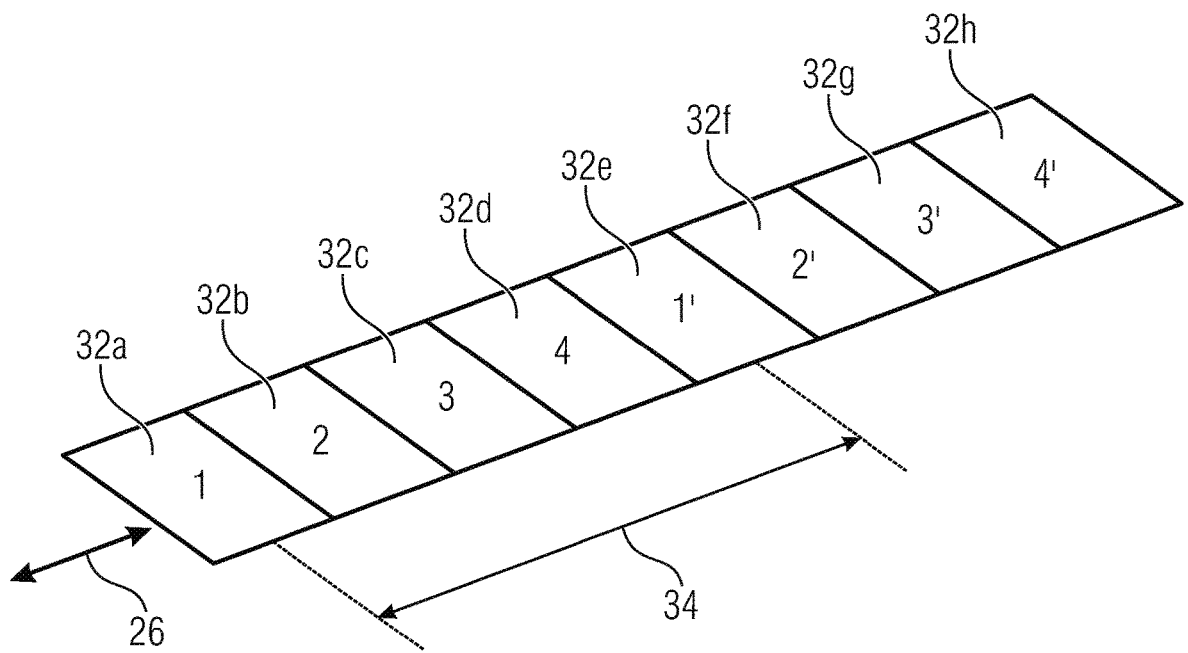
FIG. 4A shows a schematic view of the beam-deflecting means in accordance with an embodiment, said beam-deflecting means including a plurality of beam-deflecting areas.

FIG. 4A shows a schematic view of the beam-deflecting means 18, which includes a multitude of beam-deflecting areas 32a-h. For example, the imaging device may include a plurality or a multitude of optical channels, e.g., two, four or a larger number. For example, if the imaging device comprises four optical channels, the beam-deflecting means 18 may include a number of beam-deflecting areas or beam-deflecting elements 32a-h in accordance with a number of the optical channels multiplied by a number of operating states between which the beam-deflecting means 18 or the portable device can be switched. For example, the beam-deflecting areas 32a and 32e may by associated with a first optical channel, the beam-deflecting area 32a deflecting the optical path of the first optical channel in the first operating state, and the beam-deflecting area 32e deflecting the optical path of the first optical channel in the first operating state. Similarly, the beam-deflecting areas 32b and 32f, 32c and 32g, and 32d and 32h, respectively, may be associated with further optical channels.

The beam-deflecting means may be translationally moveable along the translational direction of movement 26 and/or may be moveable to and fro between a first position and a second position of the beam-deflecting means 18 with regard to the optical channels of the imaging device so as to change between the first operating state and the second operating state. A distance 34 across which the beam-deflecting means 18 is moved between the first position and the second position may correspond at least to a distance between four optical channels of the imaging device. The beam-deflecting means 18 may comprise block-by-block sorting of the beam-deflecting elements 32a-h. For example, the beam-deflecting elements 32a-d may be configured to deflect the optical paths of the imaging device into a first viewing direction toward a first field of view, it being possible for each optical channel to be associated with a partial field of view of the total field of view. The beam-deflecting elements 32e-h may be configured to deflect the optical paths of the imaging device into a second viewing direction toward a second field of view, it being possible for each optical channel to be associated with a partial field of view of the total field of view. In accordance with further embodiments, it is possible for optical paths of at least two optical channels to be deflected by a beam-deflecting element, so that a number of beam-deflecting elements of the beam-deflecting means 18 may be smaller.

The beam-deflecting elements 32a-h may be areas of the beam deflection means 18 which have mutually different curvatures, or they may be planar facets of a facet mirror. For example, the beam-deflecting means 18 may be understood to be an array of facets and/or deflection areas 32a-h exhibiting mutually different inclinations, so that optical paths of optical channels which impinge on the beam-deflecting means 18 are directed into mutually different partial fields of view of the field of view of the first operating state, and that optical paths which impinge on deflection areas 32e-h and are deflected by same are directed into mutually different partial fields of view of a field of view of the second operating state.

Figure 4B:
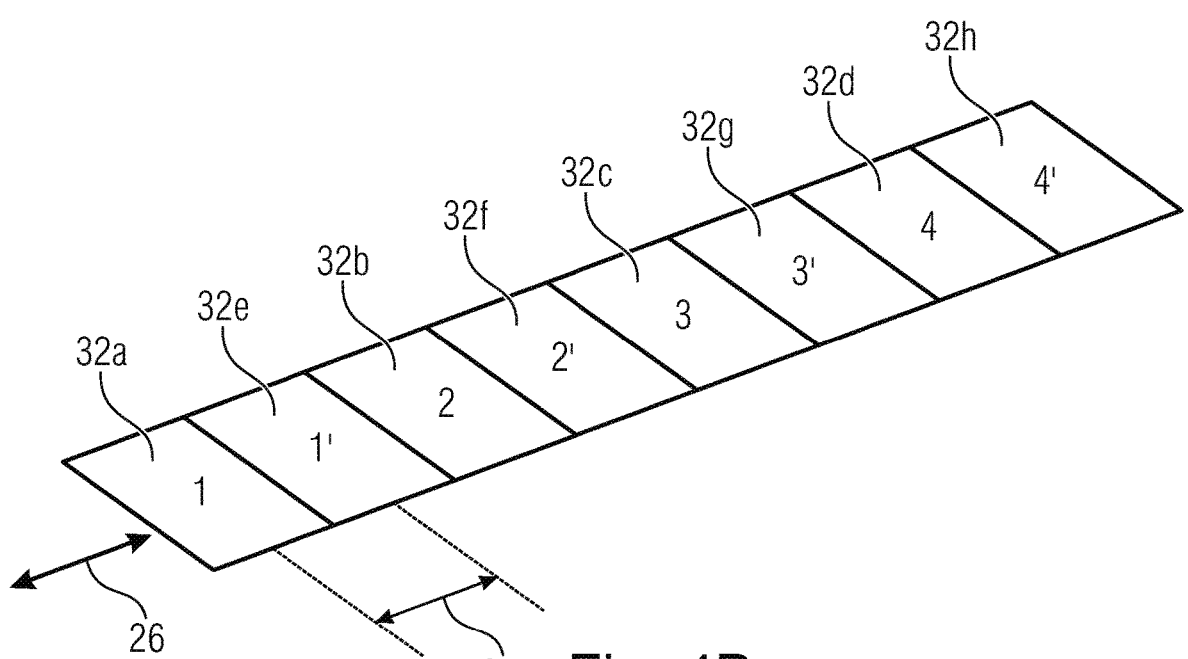
FIG. 4B shows a schematic view of the beam-deflecting means in accordance with a configuration that is an alternative to FIG. 4A, and in accordance with an embodiment.

FIG. 4B shows a schematic view of the beam-deflecting means 18 in accordance with a configuration different from the configuration of FIG. 4A. While the configuration of FIG. 4A may be understood to be block-by-block sorting of the beam-deflecting areas 32a-h on the basis of an operating state, the configuration of FIG. 4B may be understood to be channel-by-channel sorting of the beam-deflecting areas 32a-h on the basis of a sequence of the optical channels of the imaging device. The beam-deflecting areas 32a and 32e which are associated with the first optical channel may be arranged adjacently to each other. By analogy, the beam-deflecting areas 32b and 32f, 32c and 32g, and 32d and 32h, respectively, which may be associated with the optical channels 2, 3 and 4, respectively, may be arranged adjacently to each another. For example, if the optical channels of the imaging device have a sufficiently large distance to one another, a distance 34' across which the beam-deflecting means 18 is moved so as to be moved to and fro between the first position and the second position may be smaller than the distance 34, for example it may be a quarter or half thereof. This enables a further reduced structural design of the imaging device and/or of the portable device.

By means of FIGS. 4C-G, advantageous implementations of the beam-deflecting means 18 will be described. The explanations will illustrate a number of advantages which can be implemented individually or in any combination but are not intended to be limiting.

Figure 4C:
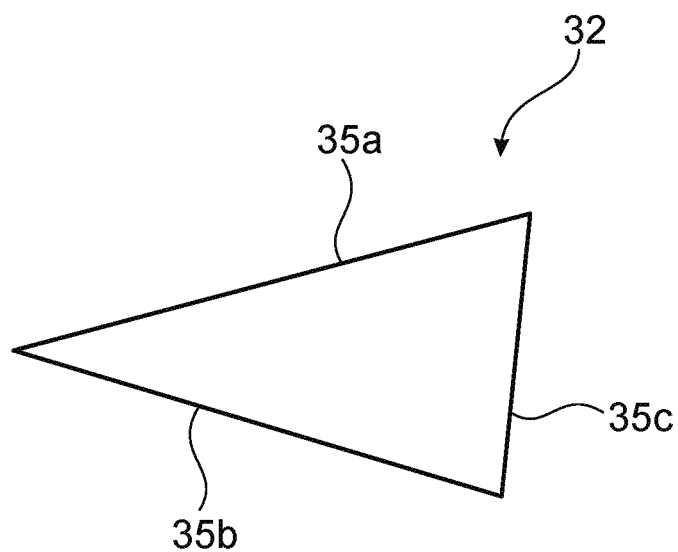
FIG. 4C shows a schematic sectional view of a beam-deflecting element in accordance with an embodiment.

FIG. 4C shows a schematic sectional side view of a beam-deflecting element 32 as may be employed for a beam-deflecting means described herein, e.g., the beam-deflecting means 18 of FIG. 4A or 4B. The beam-deflecting element 32 may have a cross section in the manner of a polygon chain. Even though a triangular cross section is shown, any other polygon is also possible. Alternatively or additionally, the cross section may also comprise at least one curved surface; in particular with reflecting surfaces, a configuration which is planar at least in sections may be advantageous so as to avoid aberrations.

For example, the beam-deflecting element 32 comprises a first side 35a, a second side 35b and a third side 35c. At least two sides, e.g. sides 35a and 35b, are configured to be reflective, so that the beam-deflecting element 32 is configured to be reflective on both sides. The sides 35a and 35b may be main sides of the beam-deflecting element 32, i.e., sides whose surface areas are larger than that of side 35c.

In other words, the beam-deflecting element 32 may have the shape of a wedge and be formed to be reflective on both sides. A further face which, however, is considerably smaller than the face 35c, may be arranged opposite the face 35c, i.e., between the faces 35a and 35b. In other words, in such a case the wedge formed by the faces 35a, 35b and 35c does not taper arbitrarily but is provided with a face on the pointed side and is therefore truncated.

Figure 4D:
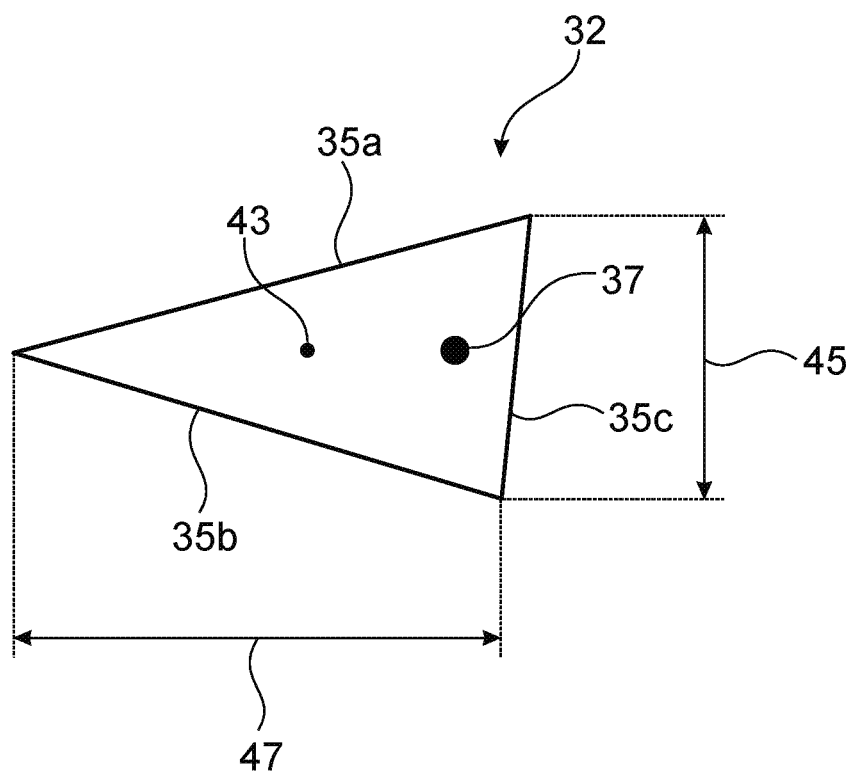
FIG. 4D shows a schematic sectional view of a beam-deflecting element in accordance with an embodiment.

FIG. 4D shows a schematic sectional side view of the beam-deflecting element 32, wherein a suspension or a displacement axis 37 of the beam-deflecting element 32 is described. The displacement axis 37 about which the beam-deflecting element 32 may be rotationally and/or translationally moveable in the beam-deflecting means 18 may be eccentrically displaced with regard to a centroid 43 of the cross section. The centroid may alternatively also be a point which describes half the dimension of the beam-deflecting element 32 along a thickness direction 45 and along a direction 47 perpendicular thereto.

The displacement axis may be unchanged, e.g., along a thickness direction 45 and may have any offset in a direction perpendicular thereto. Alternatively, an offset along the thickness direction 45 is also conceivable. The displacement may be effected, e.g., such that upon rotation of the beam-deflecting element 32 about the displacement axis 37, a travel range is obtained which is larger than that obtained upon rotation about the centroid 43. Thus, the travel by which the edge between the sides 35a and 35b is moved upon rotation may increase, due to the displacement of the displacement axis 37, as compared to a rotation about the centroid 43, given an identical angle of rotation. The beam-deflecting element 32 is arranged such that the edge, i.e., the pointed side of the wedge-shaped cross section, located between the sides 35a and 35b faces the image sensor. Thus, a respectively other side 35a or 35b may deflect the optical path of the optical channels by means of small rotational movements. This shows that the rotation may be performed such that a space requirement of the beam-deflecting means along the thickness direction 45 is small since a movement of the beam-deflecting element 32 such that a main side will be perpendicular to the image sensor is not needed.

The side 35c may also be referred to as a secondary side or as a rear side. Several beam-deflecting elements may be connected to one another such that a connecting element is arranged on the side 35c or extends through the cross section of the beam-deflecting elements, i.e., is arranged inside the beam-deflecting elements, for example in the area of the displacement axis 37. In particular, the holding element may be arranged to not project, or to project to a small extent only, i.e., by a maximum of 50%, by a maximum of 30% or by a maximum of 10%, beyond the beam-deflecting element 32 along the direction 45, so that the holding element does not increase or determine the extension of the overall design along the direction 45. Alternatively, the extension in the thickness direction 45 may be determined by the lenses of the optical channels, i.e., said lenses have the dimension defining the minimum thickness.

The beam-deflecting element 32 may be formed from glass, ceramics, glass ceramic, plastic, metal or any combination of said materials and/or of further materials.

In other words, the beam-deflecting element 32 may be arranged such that the tip, i.e. the edge located between the main sides 35a and 35b, points toward the image sensor.

Retention of the beam-deflecting elements may be effected such that it occurs only on the rear side of, or inside, the beam-deflecting elements, i.e. the main sides are not concealed. A shared holding or connecting element may extend across the rear side 35c. The axis of rotation of the beam-deflecting element 22 may be arranged eccentrically.

Figure 4E:
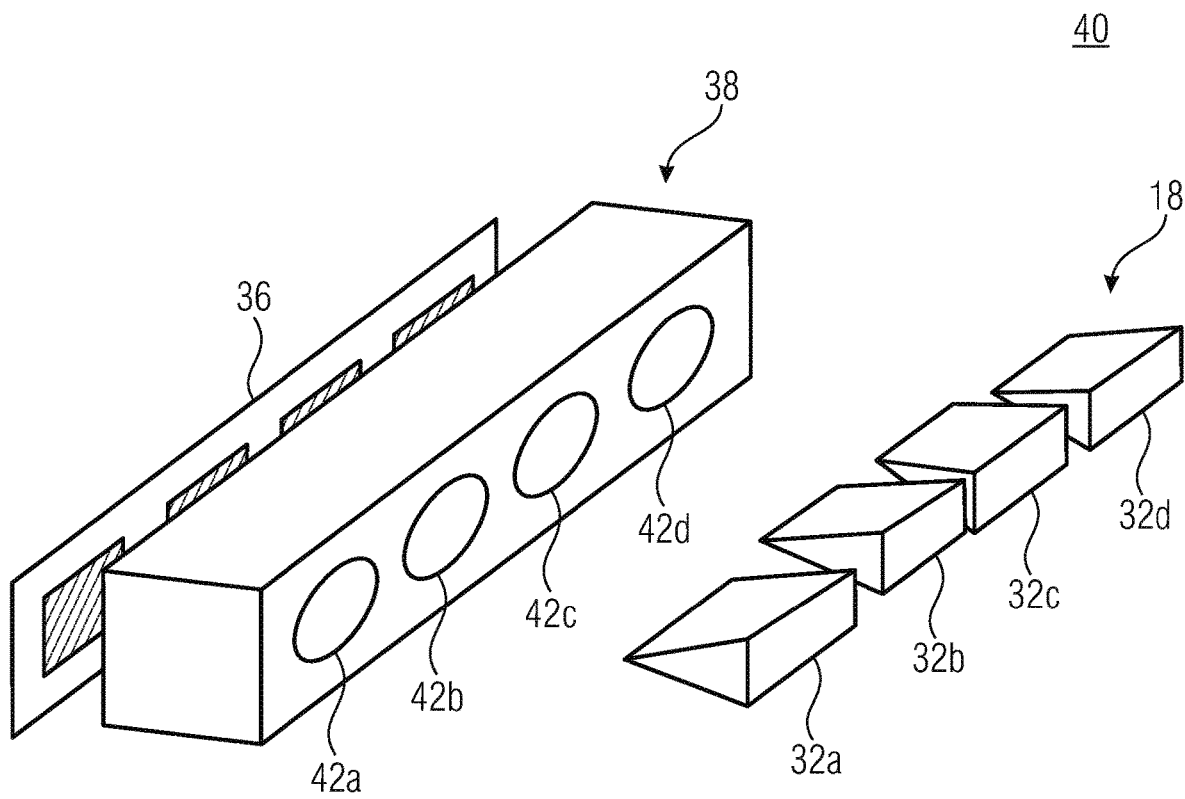
FIG. 4E shows a schematic perspective view of a multi-aperture imaging device in accordance with an embodiment.

FIG. 4E shows a schematic perspective view of a multi-aperture imaging device 40 including an image sensor 36 and a one-line array 38 of adjacently arranged optical channels 42A-D. The beam-deflecting means 18 includes a number of beam-deflecting elements 32a-d which may correspond to the number of optical channels. Alternatively, a smaller number of beam-deflecting elements may be arranged, for example when at least one beam-deflecting element is used by two optical channels. Alternatively, a larger number may be arranged, such as when the deflection direction of the beam-deflecting means 18 is switched by a translational movement, as described in connection with FIGS. 4A and 4B. Each beam-deflecting element 32a-d may be associated with an optical channel 42a-d. The beam-deflecting elements 32a-d may be configured as a multitude of elements 32 in accordance with FIGS. 4C and 4D. Alternatively, at least two, several or all of the beam-deflecting elements 32a-d may be formed integrally with one another.

Figure 4F:
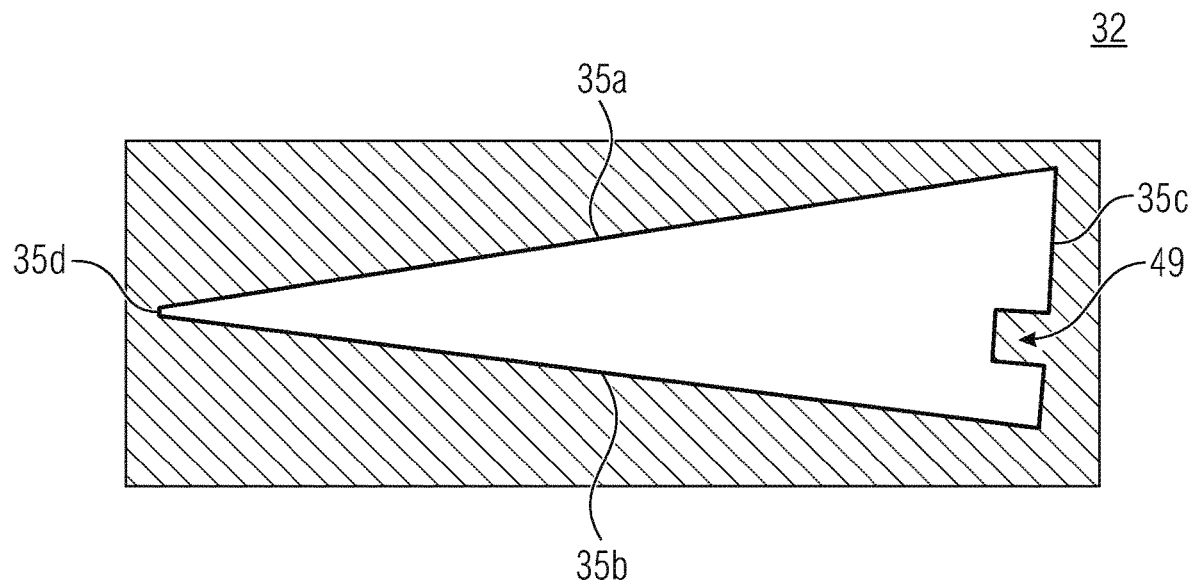
FIG. 4F shows a schematic sectional side view of the beam-deflecting element in accordance with an embodiment.

FIG. 4F shows a schematic sectional side view of the beam-deflecting element 32, the cross section of which is formed as a freeform surface. Thus, the side 35c may comprise a recess 49 enabling attachment of a holding element; the recess 49 may also be formed as a protruding element, such as a key of a slot-and-key system. The cross section further comprises a fourth side 35d which has a smaller surface area than the main sides 35a and 35b and connects same with each other.

Figure 4G:
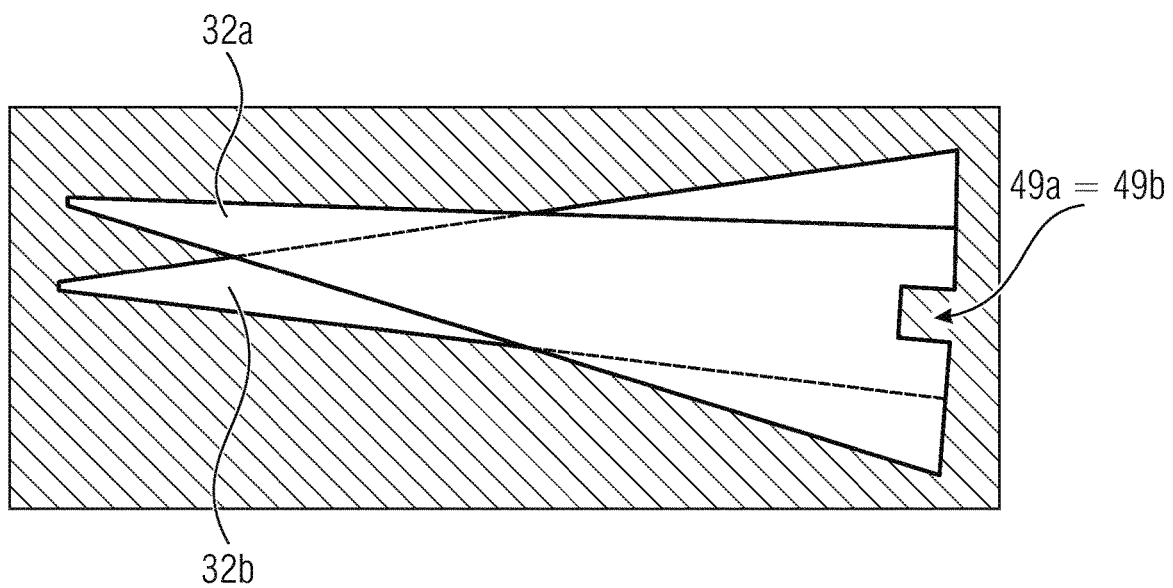
FIG. 4G shows a schematic sectional side view of a first beam-deflecting element and of a second beam-deflecting element in accordance with an embodiment.

FIG. 4G shows a schematic sectional side view of a first beam-deflecting element 32a and of a second beam-deflecting element 32b, which is located behind the former as seen in the direction of presentation. The recesses 49a and 49b may be arranged to be essentially congruent, so that it is possible to arrange a connecting element in the recesses.

Figure 4H:
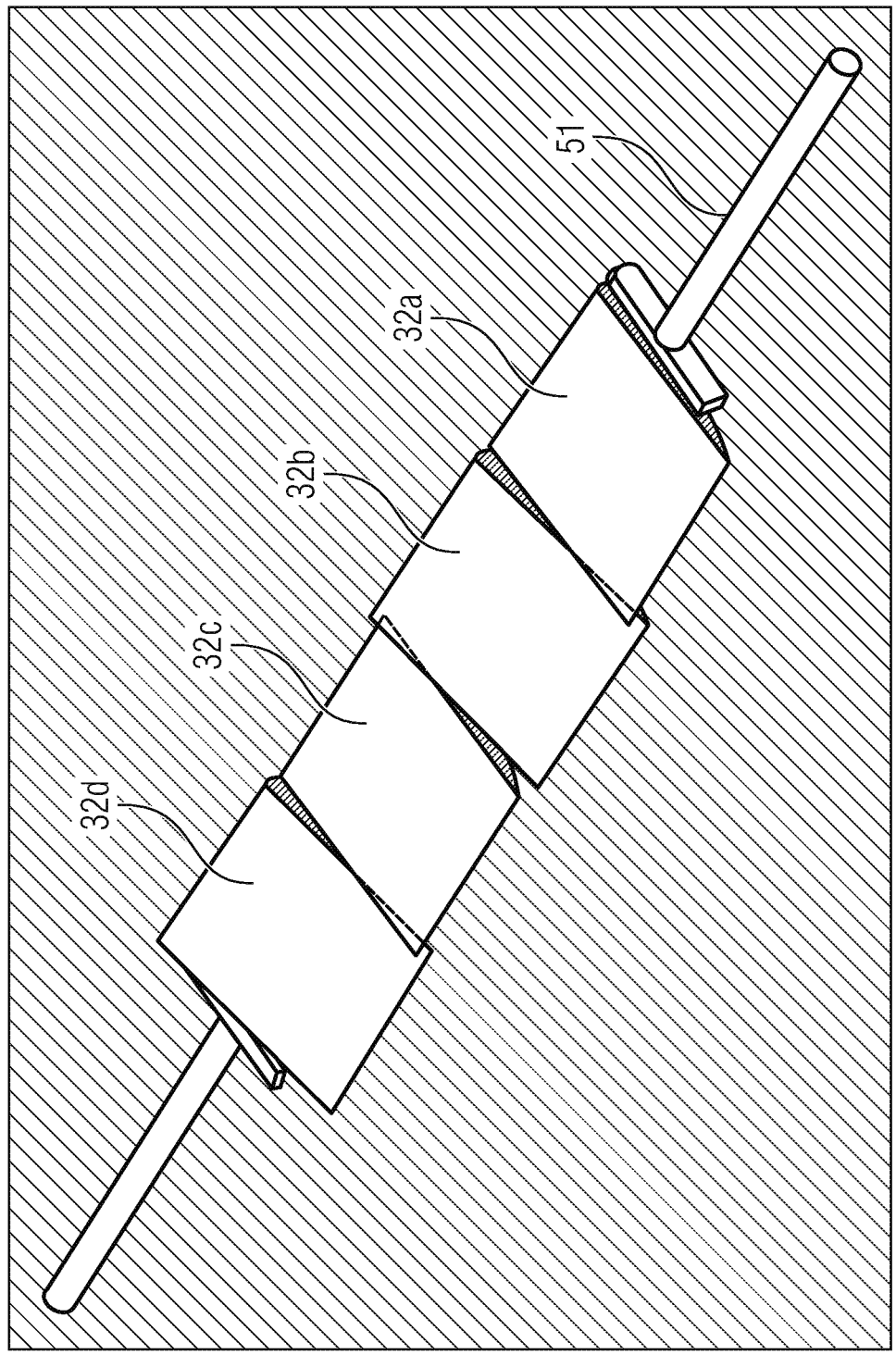
FIG. 4H shows a schematic perspective view of the beam-deflecting means including beam-deflecting elements which are connected to a connecting element.

FIG. 4H shows a schematic perspective view of the beam-deflecting means 18 including, e.g., four beam-deflecting elements 32a-d which are connected to a connecting element 51. The connecting element may be used for being translationally and/or rotationally moveable by an actuator. The connecting element 51 may be integrally formed and may extend across an extension direction, e.g. the y direction in FIG. 4e, on or within the beam-deflecting elements 32a-d. Alternatively, the connecting element 51 may be coupled only to at least one side of the beam-deflecting means 18, for example when the beam-deflecting elements 32a-d are integrally formed. Alternatively, a connection to an actuator and/or a connection of the beam-deflecting elements 32a-d may also occur in any other way, for example by means of adhesion, wringing or soldering, for example.

Figure 5A:
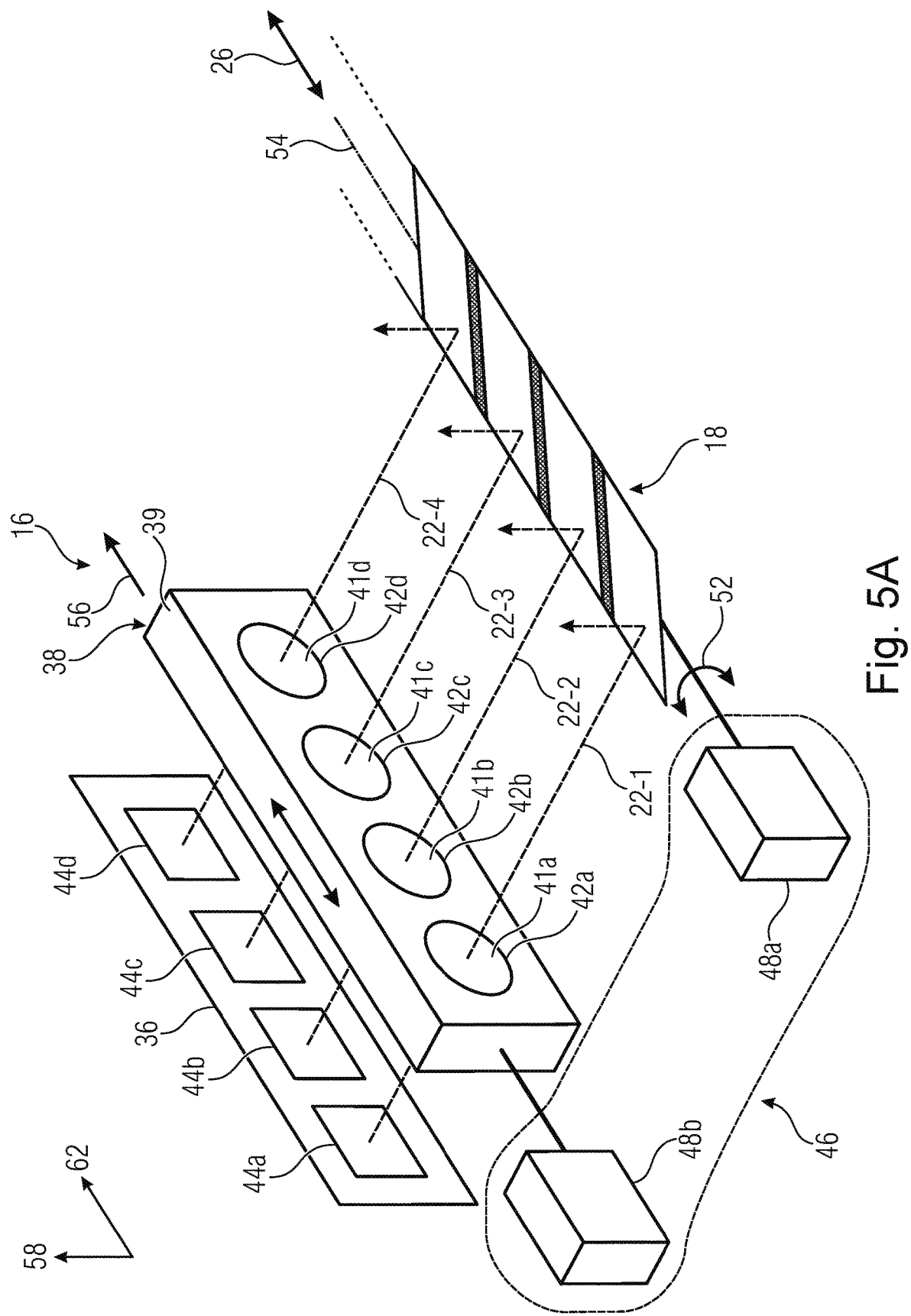
FIG. 5A shows a schematic perspective view of an imaging device in accordance with an embodiment.

FIG. 5A shows a schematic perspective view of the imaging device 16. The imaging device 16 includes the beam-deflecting means 18, an image sensor 36 and a one-line array 38 of adjacently arranged optical channels 42A-D. Each optical channel 42A-D may comprise an optic configured to optically influence optical paths 22-1 to 22-4 of the imaging device 16. The image sensor 36 may include image sensor areas 44a-d; the optical paths 22-1 to 22-4 of the optical channels 22a-d each may impinge upon an image sensor area 44a-d. In simplified terms, each image sensor area 44a-d may have an optical channel 22a-d and/or an optical path 22-1 to 22-4 associated therewith. The beam-deflecting means 18 may be configured to deflect the optical paths 22-1 to 22-4 into mutually different directions on the basis of mutually different operating states of the portable device, as described, for example, in connection with FIGS. 1, 2, 3A, 3B, 4A-H. This means that the imaging device 16 may be formed as or include the multi-aperture imaging device 40.

The image sensor areas 44a-d may each be formed from a chip, for example, which includes a corresponding pixel array; the image sensor areas may be mounted on a shared substrate and/or a shared circuit board. Alternatively, it would also be possible, of course, for the image sensor areas 44a-d to each be formed from a part of a shared pixel array continually extending across the image sensor areas 44a-d, the shared pixel array being formed, e.g., on an individual chip. For example, only the pixel values of the shared pixel array will then be read out in the image sensor areas 44a-d. Various combinations of said alternatives are also possible, of course, such as the presence of one chip for two or more channels and of a further chip for yet other channels or the like. In the case of several chips of the image sensor 36, said chips may be mounted on one or more circuit boards, for example all together or in groups or the like.

The one-line array 38 may comprise a carrier 39 at which optics 41a-d of the optical channels are arranged. The carrier 39 may be passed through by the optical paths 22-1 to 22-4 used for imaging in the individual optical channels. The optical channels of the multi-aperture imaging device may traverse the carrier 39 between the beam-deflecting means 18 and an image sensor 36. The carrier 39 may maintain a relative position between the optics 41a-d in a stable manner. The carrier 39 may be transparently formed and include, e.g., a glass material and/or a polymer material. The optics 41a-d may be arranged on at least one surface of the carrier 39. This enables a small dimension of the carrier 39, and, therefore, of the one-line array 38 along a direction parallel to the image sensor 36 and perpendicular to the line extension direction 56 since enclosure of the optics 41a-d within a circumferential area of same may be dispensed with. In accordance with embodiments, the carrier 39 is not configured to be larger, or is configured to be only marginally larger, i.e. by a maximum of 20%, by a maximum of 10% or by a maximum of 5%, than a corresponding dimension of the optic 41a-d along the direction that is parallel to a main side of the image sensor 36 and perpendicular to the line extension direction 56.

The beam-deflecting means may be configured such that in the first position and in the second position, it deflects the optical path 22-1 to 22-4 of each optical channel 42a-d in mutually different directions. This means that the deflected optical paths 22-1 to 22-4 may have mutual angles, as described in the context of FIG. 6. The optical channels 16a-d may be arranged in at least one line along a line extension direction 56. The array 38 may be formed as a multi-line array including at least two lines or as a one-line array including (exactly) one line of optical channels. The optical channels may be directed by the beam-deflecting means 18 on the basis of a viewing direction set toward varying fields of view. The optical channels may have angles in relation to one another within a viewing direction, so that the optical channels are directed into partial fields of view of the total field of view which only partly overlap, if they overlap at all. The different angles of the optical channels may be obtained on the basis of the optics of the optical channels and/or on the basis of mutually different deflections of the optical channels at the beam-deflecting means 18.

The imaging device 16 may include an optical image stabilizer 46 configured to enable optical image stabilization of an image captured by the image sensor 36. To this end, the optical image stabilizer 46 may include an actuator 48a configured to produce a rotational movement 52 of the beam-deflecting means 18. The rotational movement 52 may occur about a rotational axis 54; the rotational axis 54 of the beam-deflecting means 18 may be arranged in a central area of the beam-deflecting means 18 or at a distance therefrom. The rotational movement 52 may be superimposed upon the rotational movement 28 and/or the translational movement 26 for switching the beam-deflecting means between first and second positions or operating states. If the beam-deflecting means 18 is translationally moveable, the translational movement 26 may be spatially arranged in parallel with a line extension direction 56 of the one-line array 38. The line extension direction 56 may relate to a direction along which the optical channels 42a-d are adjacently arranged. On the basis of the rotational movement 52, an optical image stabilization may be obtained along a first image axis 58, possibly perpendicularly to the line extension direction 56.

Alternatively or additionally, the optical image stabilizer 46 may include an actuator 48b configured to translationally move the one-line array 38 along the line extension direction 56. On the basis of the translational movement of the one-line array 38 along the line extension direction 56, optical image stabilization may be obtained along a second image axis 62, possibly in parallel with the line extension direction 56 and/or in parallel with the direction of movement of the one-line array 38. The actuators 48a and 48b may be formed, for example, as piezoelectric actuators, pneumatic actuators, hydraulic actuators, DC motors, stepper motors, thermal actuators, electrostatic actuators, electrostrictive actuators, and/or magnetostrictive actuators. The actuators 48a and 48b may be formed to be identical with or different from each other. Alternatively, it is also possible for an actuator to be arranged which is configured to rotationally move the beam-deflecting means 18 and to translationally move the one-line array 38. For example, the rotation axis 54 may be parallel to the line extension direction 56. The rotational movement 52 about the axis of rotation 54 may result in little installation space needed for the imaging device 16 along a direction parallel to the image axis 58, so that the portable device, which inside a housing includes the imaging device 16, may also have small dimensions. In simplified terms, the portable device may comprise a flat housing.

The translational movement 26 may be implementable, e.g., in parallel or essentially in parallel with an extension of a main side 13a and/or 13b of the device 10, so that additional installation space, which may be needed for switching the beam deflection between operating states, may be arranged along the line extension direction 56 and/or so that provision of installation space along a thickness direction of the device may be dispensed with. The actuators 48a and/or 48b may be arranged along the line extension direction and/or, perpendicular thereto, in parallel with an extension direction of main sides of the housing of the device. In simplified terms, this can be described such that actuators for switching between operating states and/or actuators of the optical image stabilizer may be arranged next to, in front of or behind an extension between the image sensor, the one-line array 38 and the beam-deflecting means 18, an arrangement thereabove and/or therebelow being dispensed with in order to keep an installation height of the imaging device 16 small. This means that actuators for switching the operating state and/or the optical image stabilizer may be arranged within a plane within which the image sensor 36, the one-line array 38 and the beam-deflecting means 18 are arranged.

In accordance with further embodiments, the actuator 48b and/or other actuators may be configured to change a distance between the image sensor 36 and the one-line array 38 and/or the optics of the optical channels. To this end, e.g., the actuator 48b may be configured to move the one-line array 38 and/or the image sensor 36 in relation to each other along an optical path of the optical paths 22-1 to 22-4 and/or perpendicularly to the line extension direction 56 so as to change a focus of the imaging of the field of view and/or to obtain an autofocus function. The imaging device 16 may comprise a focusing means configured to change the focus of the imaging device. The focusing means may be configured to provide a relative movement between the one-line array 38 and the image sensor 36. The focusing means may be configured to perform the relative movement while performing a movement of the beam-deflecting means 18 that is simultaneous with the relative movement. For example, the actuator 48b or a further actuator may be configured to keep a distance between the one-line array 38 and the beam-deflecting means 18 at least essentially constant or, when no additional actuator is used, at least essentially constant, possibly precisely constant, i.e. to move the beam-deflecting means 18 as much as the one-line array 38 is moved. With cameras comprising no beam-deflecting means, implementation of a focusing function may result in an increased dimension (thickness) of the device. On the basis of the beam-deflecting means, this may occur without any additional dimension resulting along a dimension that is parallel to a main side of the image sensor 36 and perpendicular to the line extension direction 56 (e.g. a thickness) of the multi-aperture imaging device since an installation space enabling said movement may be arranged to be perpendicular thereto. On the basis of a constant distance between the one-line array 38 and the beam-deflecting means 18, beam deflection may be maintained in an adjusted (possibly optimum) state. In simplified terms, the imaging device 16 may comprise focusing means for changing a focus. The focusing means may be configured to provide a relative movement (focusing movement) between at least one optic 41a-d of the optical channels of the multi-aperture imaging device 16 and the image sensor 36. The focusing means may comprise an actuator for providing the relative movement, e.g., the actuator 48b and/or 48a. The beam-deflecting means 18 may be moved along, on account of corresponding constructive configuration or utilization, possibly while using a further actuator, simultaneously with the focusing movement. This means that a distance between the one-line array 38 and the beam-deflecting means remains unchanged and/or that the beam-deflecting means 18 is moved, at the same time or with a time lag, to a same or comparable extent as the focusing movement occurs, so that it is unchanged, as compared to a distance prior to a change of focus, at least at a point in time when the field of view is captured by the multi-aperture imaging device.

As is described in connection with FIG. 1, the deflected optical paths of the optical channels may pass through a transparent area of a housing of the device, in which transparent area a diaphragm may be arranged. In at least one operating state of the device, a diaphragm arranged in an area of the transparent area may at least partly optically close said area such that the diaphragm is effective for two, a multitude of or all of the optical channels, i.e. is in the at least partly closed state. In a different operating state, the diaphragm may be in an opened state for the two, the multitude of or all of the optical channels. This means that the diaphragms may be effective for at least two optical channels of the multi-aperture imaging device. In the first operating state, the diaphragm 24b may at least partly optically close the transparent area 14b for the two, the multitude of or all of the optical channels. In the second operating state, the diaphragm 24a may at least partly optically close the transparent area 14a for the two, the multitude of or all of the optical channels.

Figure 5B:
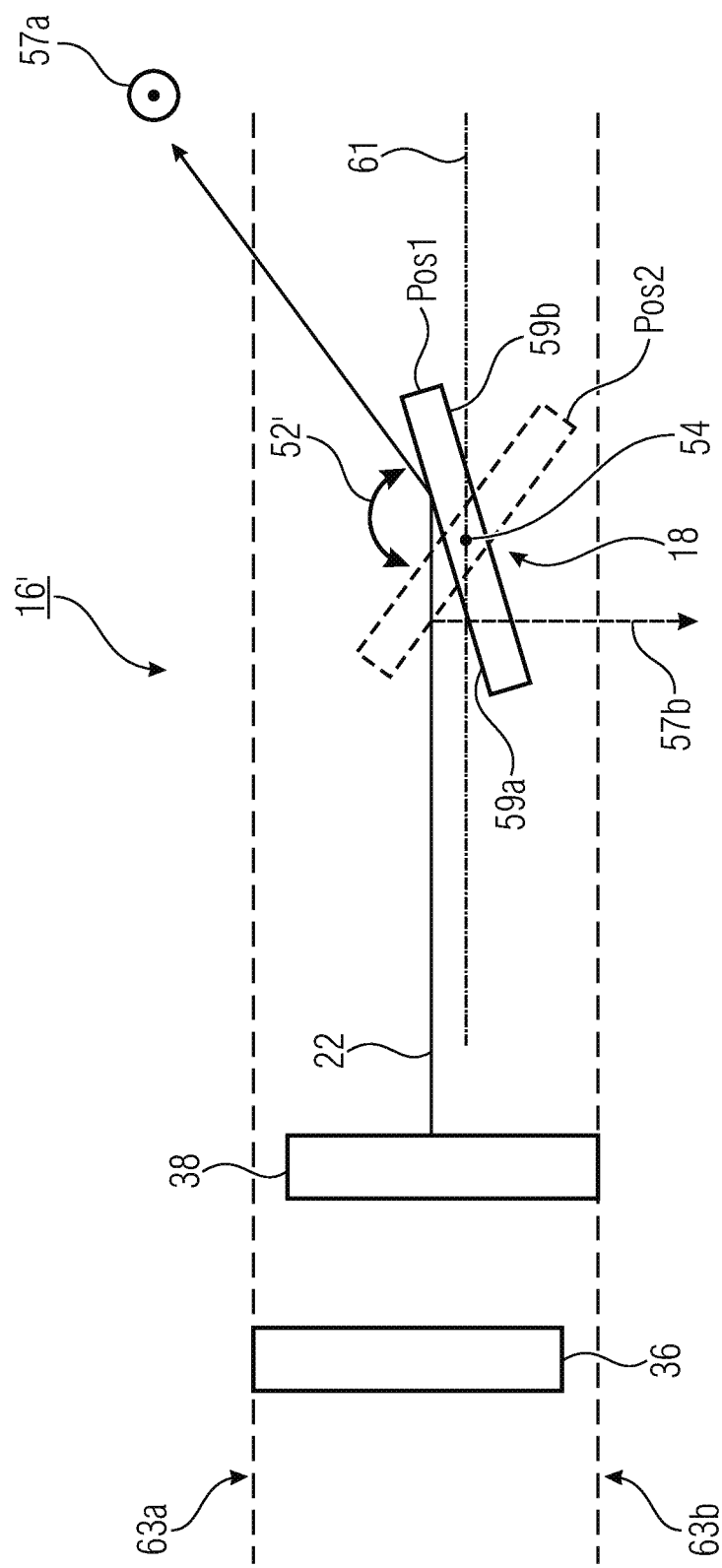
FIG. 5B shows a schematic sectional side view of a modified imaging device wherein the beam-deflecting means can be rotationally switched between a first position of the first operating state and a second position.

FIG. 5B shows a schematic sectional side view of a modified imaging device 16', wherein the beam-deflecting means 18 can be moved between a first position Pos1 of the first operating state and a second position Pos2 of the second operating state on the basis of a rotational movement 52' about the axis of rotation 54. In the first operating state, the imaging device 16' may comprise a first viewing direction 57a. In the second operating state, the imaging device 16' may have a first viewing direction 57b. Main sides 59a and 59b of the beam-deflecting means 18 may be formed to be reflective as mirrors and/or as facet elements. During switching between the operating states, the beam-deflecting means 18 may be switchable between a central position 61, so that a difference between parallel planes 63a and 63b, which distance may describe a minimum dimension of the imaging device 16' along a normal direction of the planes 63a and 63b, is influenced by the dimensions of the image sensor 36, of the array 38, but not by a movement of the beam-deflecting means 18. The rotational movement 52 may be superimposed by the rotational movement 28. In simplified terms, superposition of switching and of optical image stabilization may be implemented.

Actuators of the multi-aperture imaging device may be arranged to be at least partly arranged between two planes 63a and 63b spanned (defined) by sides of a cuboid. The sides of the cuboid may be arranged in parallel with one another as well as in parallel with the line extension direction of the array and of some of the optical path of the optical channels between the image sensor and the beam-deflecting means. The volume of the cuboid is minimal and nevertheless includes the image sensor, the array and the beam-deflecting means as well as their operation-related movements.

A thickness direction of the multi-aperture imaging device may be arranged perpendicularly to the planes 63a and/or 63b. The actuators may have a dimension or extension that is in parallel with the thickness direction. Starting from an area located between the planes 63a and 63b, a proportion of a maximum of 50%, a maximum of 30%, or a maximum of 10% of the dimension may project beyond the plane 63a and/or 63b or beyond said area. Thus, the actuators protrude beyond the plane 63a and/or 63b to a most insignificant extent, for example. In accordance with embodiments, the actuators do not protrude beyond the planes 63a and/or 63b. What is advantageous about this is that extension of the multi-aperture imaging device along the thickness direction is not increased by the actuators.

A volume of the multi-aperture imaging device may comprise a small, or minimal, installation space between the planes 63a and 63b. Along the lateral sides or extension directions of the planes 63a and/or 63b, an installation space of the multi-aperture imaging device may be large or have any size desired. The volume of the virtual cuboid is influenced, for example, by an arrangement of the image sensor 36, of the array 38 and of the beam-deflecting means; these components may be arranged, in accordance with the embodiments described herein, such that the installation space of these components along the direction perpendicular to the planes and, therefore, the mutual distance between the planes 63a and 63b become small or minimal. As compared to other arrangements of the components, the volume and/or the distance of other sides of the virtual cuboid may be enlarged.

Figure 6:
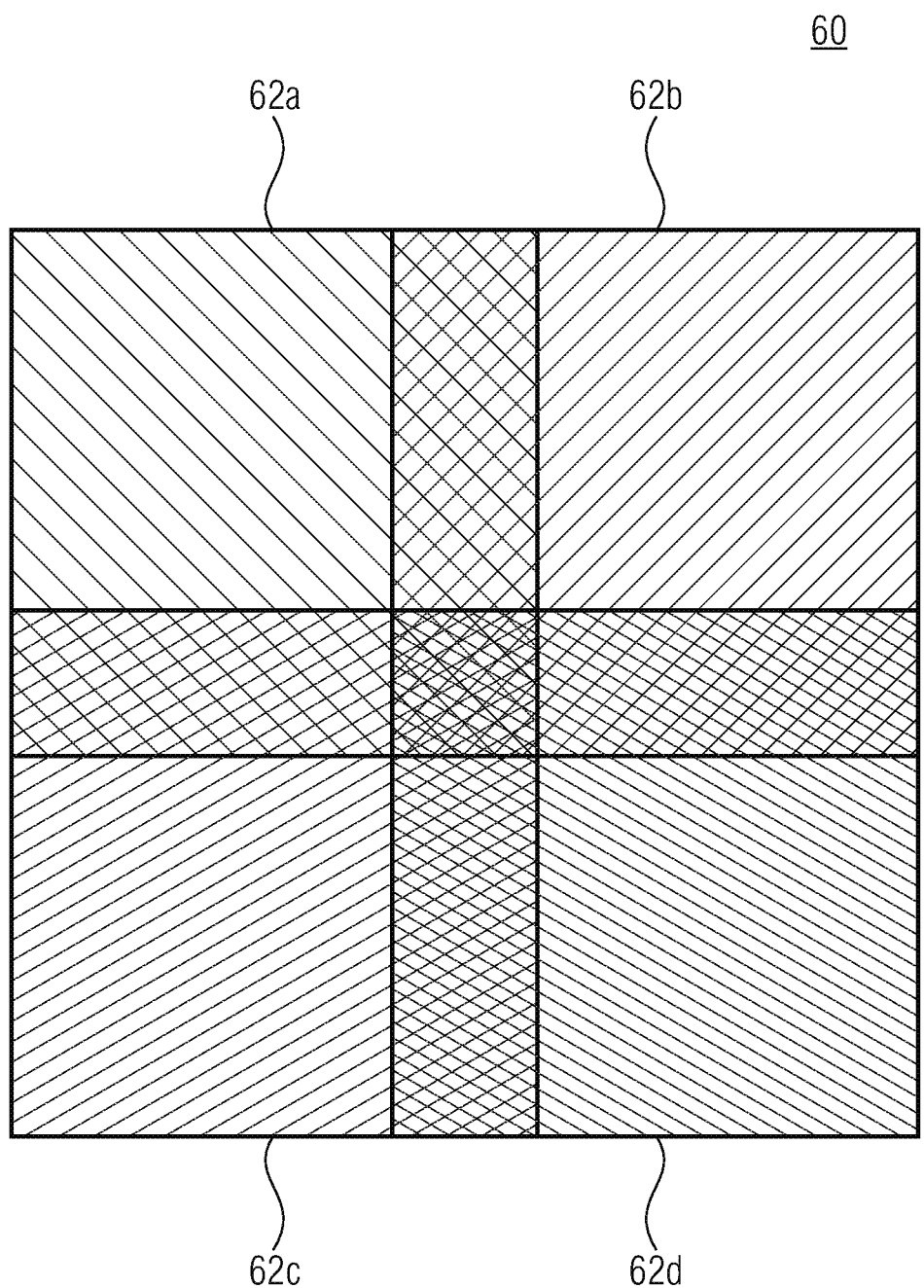
FIG. 6 shows a schematic view of a total field of view including four mutually overlapping partial fields of view.

FIG. 6 shows a schematic view of a total field of view 60 including four mutually overlapping partial fields of view 62a-d. With reference to FIG. 5, for example, the optical path 22-1 may be directed toward the partial field of view 62a, the optical path 22-2 may be directed toward the partial field of view 62b, the optical path 22-3 may be directed toward the partial field of view 62c, and/or the optical path 22-4 may be directed toward the partial field of view 62d. Even though an association between the optical paths 22-1 to 22-4 with the partial fields of view 62a-d is arbitrary, it becomes clear that starting from the beam-deflecting means 18, the optical paths 22-1 to 22-4 are directed in mutually different directions.

Figure 7:
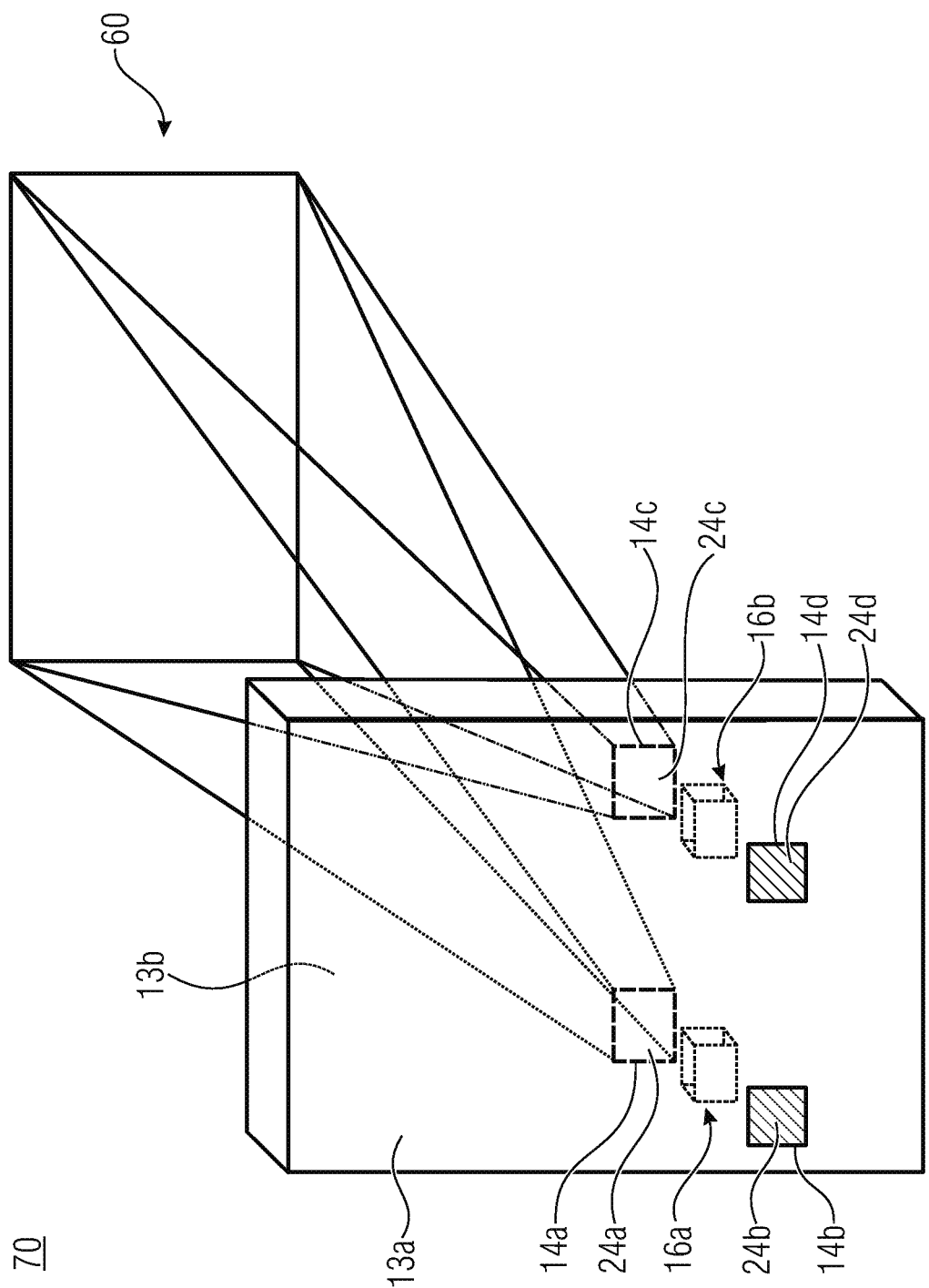
FIG. 7 shows a schematic perspective view of a device including two multi-aperture imaging devices, in accordance with an embodiment.

FIG. 7 shows a schematic perspective view of a device 70 which includes a first multi-aperture imaging device 16a and a second multi-aperture imaging device 16b and is configured to stereoscopically capture the total field of view 60 by using the multi-aperture imaging devices. The total field of view 60 is arranged, e.g., on a main side 13b facing away from the main side 13a. For example, the multi-aperture imaging devices 16a and 16b may capture the total field of view 60 by means of transparent areas 14a and/or 14c; diaphragms 24a and 24c arranged in the main side 13b are at least partly transparent. Diaphragms 24b and 24d, arranged in the main side 13a, may at least partly optically close transparent areas 14b and/or 14d, so that an extent of stray light coming from a side facing the main side 13a, which stray light may falsify the images captured by the multi-aperture imaging devices 16a and/or 16b, is at least reduced. Even though the multi-aperture imaging devices 16a and 16b are depicted to be arranged in a mutually spaced-apart manner, the multi-aperture imaging devices 16a and 16b may also be arranged in a spatially adjacent or combined manner. For example, the one-line arrays of the imaging devices 16a and 16b may be arranged adjacently to or in parallel with one another. The one-line arrays may form lines with regard to one another, each multi-aperture imaging device 16a and 16b comprising a one-line array. The imaging devices 16a and 16b may comprise a shared beam-deflecting means and/or a shared carrier 39 and/or a shared image sensor 36.

The transparent areas 14a-d may additionally be equipped with a switchable diaphragm 24a-d which covers the optical structure for when it is not in use. The diaphragm 24a-d may include a mechanically moveable part. The movement of the mechanically moveable part may be effected while using an actuator as is described, e.g., for actuators 48a and 48b. Alternatively or additionally, the diaphragm may be electrically controllable and include an electrochromic layer or a sequence of electrochromic layers.

FIG. 8 shows a schematic structure including a first multi-aperture imaging device 16a and a second multi-aperture imaging device 16b as may be arranged, for example, in the imaging system 70. The one-line arrays 38a and 38b form a shared line. The image sensors 36a and 36b may be mounted on a shared substrate and/or on a shared circuit carrier such as a shared circuit board or a shared flex board. Alternatively, the image sensors 36a and 36b may also include mutually different substrates. Various combinations of said alternatives are also possible, of course, such as multi-aperture imaging devices including a shared image sensor, a shared array and/or a shared beam-deflecting means 18 as well as further multi-aperture imaging devices comprising separate components. What is advantageous about a shared image sensor, a shared one-line array and/or a shared beam-deflecting means is that a movement of a respective component may be achieved with high precision by controlling a small number of actuators and that synchronization between actuators may be reduced or avoided. Moreover, a high level of thermal stability may be achieved. Alternatively or additionally, further multi-aperture imaging devices may also comprise a shared array, a shared image sensor and/or a shared beam-deflecting means.

It was already pointed out above that starting from the beam-deflecting means, the optical paths and/or optical axes may be directed into mutually different directions. This may be achieved in that the optical paths are directed during deflection at the beam-deflecting means and/or by the optics in deviation from being mutually parallel. The optical paths and/or optical axes may deviate from being parallel prior to, or without any, beam deflection. This circumstance will be circumscribed below by the fact that the channels may be provided with some kind of pre-divergence. With said pre-divergence of the optical axes it would be possible that, e.g., not all of the facet inclinations of facets of the beam-deflecting means differ from one another but that some groups of channels comprise, e.g., the facets having equal inclinations or are directed to same. The latter may then be formed to be integral or to continually merge into one another as a facet, as it were, which is associated with said group of channels adjacent in the line extension direction. The divergence of the optical axes of these channels might then originate from the divergence of these optical axes as is achieved by a lateral offset between optical centers of the optics of the optical channels and image sensor areas of the channels. The pre-divergence might be limited to a plane, for example. The optical axes might extend, e.g., within a shared plane prior to, or without any, beam deflection, but extend in a divergent manner within said plane, and the facets cause only an additional divergence within the other transversal plane, i.e. they are all inclined in parallel with the line extension direction and are mutually inclined only in a manner that is different from the above-mentioned shared plane of the optical axes; here, again, several facets may have the same inclination and/or be commonly associated with a group of channels whose optical axes differ pair by pair, e.g. already within the above-mentioned shared plane of the optical axes, prior to or without any beam deflection. In simplified terms, the optics may enable a (pre-) divergence of the optical paths along a first (image) direction, and the beam-deflecting means may enable a divergence of the optical paths along a second (image) direction.

The above-mentioned possibly existing pre-divergence may be achieved, for example, in that the optical centers of the optics lie on a straight line along the line extension direction, whereas the centers of the image sensor areas are arranged such that they deviate from the projection of the optical centers along the normal of the plane of the image sensor areas onto points that lie on a straight line within the image sensor plane, for example at points which deviate from the points that lie on the above-mentioned straight line within the image sensor plane, in a channel-specific manner, along the line extension direction and/or along the direction perpendicular to both the line extension direction and the image sensor normal. Alternatively, pre-divergence may be achieved in that the centers of the image sensors lie on a straight line along the line extension direction, whereas the centers of the optics are arranged to deviate from the projection of the optical centers of the image sensors along the normal of the plane of the optical centers of the optics onto points that lie on a straight line within the optic center plane, for example at points which deviate from the points that lie on the above-mentioned straight line within the optical center plane, in a channel-specific manner, along the line extension direction and/or along the direction perpendicular to both the line extension direction and the normal of the optical center plane. It is advantageous that the above-mentioned channel-specific deviation from the respective projection take place only in the line extension direction, i.e. that the optical axes which are located merely within a shared plane be provided with a pre-divergence. Both optical centers and image sensor area centers will then each be located on a straight line in parallel with the line extension direction, but with different intermediate gaps. A lateral offset between lenses and image sensors in the lateral direction perpendicular to the line extension direction would therefore result in an increase in the installation height. A mere in-plane offset in the line extension direction does not change the installation height but might possibly result in a reduced number of facets and/or in that the facets are tilted only in an angle orientation, which simplifies the design. For example, optical channels which are adjacent in each case may comprise optical axes which extend within the shared plane and are squinting in relation to one another, i.e. are provided with a pre-divergence. A facet may be arranged, with regard to a group of optical channels, to be inclined merely in one direction and to be parallel to the line extension direction.

Moreover, provision might be made for some optical channels to be associated with the same partial field of view, e.g. for the purpose of achieving a super-resolution and/or for increasing the resolution with which the corresponding partial field of view is scanned by said channels. The optical channels within such a group would then extend in parallel, e.g. prior to beam deflection, and would be deflected onto a partial field of view by one facet. Advantageously, pixel images of the image sensor of a channel of one group would be located at intermediate positions between images of the pixels of the image sensor of another channel of this group.

What would also be feasible, for example, even without any super-resolution purposes, but only for stereoscopy purposes, would be an implementation wherein a group of directly adjacent channels fully cover the total field of view with their partial fields of view in the line extension direction, and that a further group of mutually directly adjacent channels, for their part, fully cover the total field of view.

The above embodiments thus may be implemented in the form of a multi-aperture imaging device and/or of a device including such a multi-aperture imaging device, specifically with a one-line channel arrangement, wherein each channel transmits a partial field of view of a total field of view and wherein the partial fields of view partly overlap. A design comprising several such multi-aperture imaging devices for stereo, trio, quattro, etc. designs for 3D imaging is possible. In this context, most modules may be implemented as one contiguous line. The contiguous line might benefit from identical actuators and a shared beam-deflecting element. One or more amplifying substrates that might possibly exist within the optical path may extend across the entire line, which may form a stereo, trio, quattro design. Super-resolution methods may be employed, several channels imaging the same partial image areas. The optical axes may extend in a divergent manner already without any beam-deflecting device, so that fewer facets on the beam-deflecting unit are needed. The facets will then advantageously only exhibit one angular component. The image sensor may be in one part, comprise only one contiguous pixel matrix or several interrupted ones. The image sensor may be composed of many partial sensors which are arranged, e.g., adjacently to one another on a printed circuit board. An autofocus drive may be configured such that the beam-deflecting element is moved synchronously with the optics or is idle.

In principle, any number of submodules including image sensor(s), imaging optic(s) and mirror array(s) may be arranged. Submodules may also be configured as a system. The submodules or systems may be installed within a housing such as a smart phone, for example. The systems may be arranged in one or more lines and/or rows and at any desired location. For example, two imaging devices 16 may be arranged within the housing 12 so as to enable stereoscopic capturing of a field of view.

In accordance with further embodiments, the device 70 includes further multi-aperture imaging devices 16, so that the total field of view 60 may be scanned by means of more than two multi-aperture imaging devices. This enables a number of partially overlapping channels which capture the total field since their viewing directions are adapted channel by channel. For capturing the total field of view in a stereoscopic manner or in a manner comprising a higher order, at least one further arrangement of channels may be arranged in accordance with embodiments described herein and/or with the described arrangement of channels, which may take shape as precisely one line or as separate modules. This means that the one-line array may be arranged, in a multi-line manner, with a further line; said further line of optical channels can be associated with a further multi-aperture imaging device. The optical channels of the further line may also capture respectively overlapping partial areas and together cover the total field of view. This enables obtaining a stereo, trio, quattro, etc. structure of array cameras consisting of channels which partly overlap and which cover the total field of view within their subgroup.

In other words, multi-aperture cameras comprising a linear channel arrangement may include several optical channels arranged adjacently to one another and transmitting parts of the total field of view, respectively. In accordance with embodiments, a mirror (beam-deflecting means) may be advantageously arranged before the imaging lenses, which mirror may be used for beam deflection and may contribute to reducing the installation height. In combination with a mirror adapted channel-by-channel such as a facet mirror, for example, wherein the facets may be planar or exhibit any type of curvature or be provided with a freeform surface, it may be advantageous to structure the imaging optics of the channels in an essentially identical manner, whereas the viewing directions of the channels are influenced or predefined by the individual facets of the mirror array. In combination with a planar mirror (a mirror configured to be flat), the imaging optics of the channels may be configured or implemented differently, so that different viewing directions will result. The deflection mirror (beam-deflecting device) may be pivoted; the axis of rotation may extend perpendicularly to the optical channels, i.e., in parallel with the line extension direction of the channels. The deflection mirror may be reflective on both sides; metallic or dielectric layers or sequences of layers may be arranged to obtain reflectivity.

Rotation or translational displacement of the mirror may be analogous or stable along two or several directions. Stable may be understood to mean that a force is to be applied to achieve a movement along a predicted direction; when said force is fallen below, this may result in freezing or a rearward movement of the beam-deflecting means.

The analogous rotation (rotation movement 52) may be used for one-dimensional adaptation of the image location, which may be understood as being optical image stabilization. For example, a movement by only a few degrees may be sufficient here, e.g., ≤15°, ≤10° or ≤1°. The rotation of the mirror which is stable along two or several directions may be used for switching the viewing direction of the camera. One may switch, for example, between the viewing directions in front of, next to and behind the display. Analogous movements or positions and movements or positions which are stable along two/several directions may be combinable, i.e., superimposable. For example, solutions found for portable devices such as smartphones, for example, which use two cameras with different viewing directions toward the front and toward the rear, may be replaced, by embodiments described herein, by a structure which includes only one imaging device. Unlike known solutions, the structure may be characterized, for example, that the viewing window is arranged within the housing for the cameras with front and rear viewing directions at the same position, i.e. in an opposite manner within upper or lower housing covers. Areas of said housing covers which are arranged for beam passage may be transparent and may consist of or include glass and/or polymers in the event that visible light is used.

Even though the above-described embodiments have been described in the sense that the device has first and second operating states, further operating states may be arranged, in accordance with further embodiments, for capturing further fields of view, i.e., at least a third field of view.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Device comprising:
   a housing comprising a first transparent area and a second transparent area;
   a multi-aperture imaging device arranged inside the housing and comprising a beam deflector;
   a first diaphragm and a second diaphragm;
   the portable device comprising a first operating state and a second operating state;
   wherein in the first operating state, the beam deflector deflects an optical path of the multi-aperture imaging device such that it passes through the first transparent area and that the second diaphragm at least partly optically closes the second transparent area; and
   wherein in the second operating state, the beam deflector deflects the optical path of the multi-aperture imaging device such that it passes through the second transparent area and that the first diaphragm at least partly optically closes the first transparent area;
   wherein the beam deflector can be moved between a first position in the first operating state and a second position in the second operating state on the basis of a rotational movement about an axis of rotation;
   wherein optical channels of the multi-aperture imaging device are directed by the beam deflector on the basis of a set viewing direction toward varying total fields of view and comprise angles in relation to one another within a viewing direction, so that the optical channels are directed into partial fields of view of a total field of view which, at the most, only partly overlap; and
   wherein optical channels each comprise one or several optics for changing an optical path of the imaging device and an image sensor area and are deflected by the beam deflector.

2. Device as claimed in claim 1, wherein the beam deflector is formed to be reflective on both sides and deflects the optical paths with a first main side in the first position and deflects the optical paths with a second main side in the second position.

3. Device as claimed in claim 1, wherein the first diaphragm and/or the second diaphragm is formed as an electrochromic diaphragm.

4. Device as claimed in claim 1, wherein the first diaphragm and the second diaphragm are effective for at least two optical channels of the multi-aperture imaging device.

5. Device as claimed in claim 1, configured as a portable device.

6. Device as claimed in claim 5, the mobile device comprising a display, and the first diaphragm or the second diaphragm being arranged in an area of the display.

7. Device as claimed in claim 6, wherein information of the display can be at least periodically presented in an area of the display within which the first or the second diaphragm is arranged.

8. Device as claimed in claim 1, wherein the housing is formed to be flat and wherein at least a first extension along a first housing direction and a second extension along a second housing direction comprise at least three times the dimension of a third extension along a third housing direction.

9. Device as claimed in claim 1, wherein the first transparent area and the second transparent area are oppositely arranged.

10. Device as claimed in claim 1, wherein the first transparent area and the second transparent area are arranged in at least one main side of the housing.

11. Device as claimed in claim 1, wherein the multi-aperture imaging device comprises a one-line array of adjacently arranged optical channels.

12. Device as claimed in claim 11, wherein the beam deflector comprises a first position and a second position between which the beam deflector is translationally moveable along a line extension direction of the one-line array, the beam deflector being configured such that it deflects the optical path of each optical channel into mutually different directions depending on whether it is located in the first position or in the second position.

13. Device as claimed in claim 12, wherein the multi-aperture imaging device further comprises an optical image stabilizer for image stabilization along an image axis (58) by generating a rotational movement of the beam deflector.

14. Device as claimed in claim 1, comprising at least one further multi-aperture imaging device, the device being configured to at least stereoscopically capture a total field of view.

15. Device as claimed in claim 1, wherein the multi-aperture imaging device comprises focusing unit for changing a focus, the focusing unit comprising an actuator for providing a relative movement between an optic of optical channels of the multi-aperture imaging device and an image sensor of the multi-aperture imaging device.

16. Device as claimed in claim 15, wherein the focusing unit is configured to perform the relative movement while performing a movement, simultaneous with said relative movement, of the beam deflector.

17. Device as claimed in claim 1, wherein the multi-aperture imaging device comprises a transparent carrier, wherein optical channels of the multi-aperture imaging device traverse the transparent carrier between the beam deflector and an image sensor of the multi-aperture imaging device.

18. Method of providing a device, comprising:
providing a housing comprising a first transparent area and a second transparent area;
arranging a multi-aperture imaging device, which comprises a beam deflector, inside the housing;
arranging a first diaphragm and a second diaphragm;
so that the portable device comprises a first operating state and a second operating state;
so that in the first operating state, the beam deflector deflects an optical path of the imaging device such that it passes through the first transparent area and that the second diaphragm at least partly optically closes the second transparent area; and
so that in the second operating state, the beam deflector deflects the optical path of the imaging device such that it passes through the second transparent area and that the first diaphragm at least partly optically closes the first transparent area;
so that the beam deflector can be moved between a first position in the first operating state and a second position in the second operating state on the basis of a rotational movement about an axis of rotation;
so that optical channels of the multi-aperture imaging device may be directed by the beam deflector on the basis of a set viewing direction toward varying fields of view and may comprise angles in relation to one another within a viewing direction, so that the optical channels are directed into partial fields of view of a total field of view which, at the most, only partly overlap,
so that optical channels each comprise one or several optics for changing an optical path of the imaging device and an image sensor area and are deflected by the beam deflector.

* * * * *